(12) United States Patent
Hunt et al.

(10) Patent No.: US 11,315,380 B2
(45) Date of Patent: Apr. 26, 2022

(54) DIRECT-SCAN CASH-MANAGEMENT SYSTEMS AND METHODS

(71) Applicants: Dale Hunt, Escondido, CA (US); Ethelind Mizar, Tigard, OR (US)

(72) Inventors: Dale Hunt, Escondido, CA (US); Ethelind Mizar, Tigard, OR (US)

(73) Assignee: Cash Genius, Inc., Tigard, OR (US)

( * ) Notice: Subject to any disclaimer, the term of this patent is extended or adjusted under 35 U.S.C. 154(b) by 0 days.

(21) Appl. No.: 17/266,344

(22) PCT Filed: Aug. 6, 2019

(86) PCT No.: PCT/US2019/045376
§ 371 (c)(1),
(2) Date: Feb. 5, 2021

(87) PCT Pub. No.: WO2020/033458
PCT Pub. Date: Feb. 13, 2020

(65) Prior Publication Data
US 2021/0327199 A1 Oct. 21, 2021

Related U.S. Application Data

(60) Provisional application No. 62/715,198, filed on Aug. 6, 2018, provisional application No. 62/832,205, filed on Apr. 10, 2019.

(51) Int. Cl.
*G07D 11/34* (2019.01)
*G07D 11/50* (2019.01)
*G06Q 20/20* (2012.01)
*G07G 1/00* (2006.01)

(52) U.S. Cl.
CPC .......... *G07D 11/34* (2019.01); *G06Q 20/203* (2013.01); *G07D 11/50* (2019.01); *G07G 1/0027* (2013.01)

(58) Field of Classification Search
CPC ........ G07D 11/34; G07D 11/50; G07D 11/30; G07D 11/32; G07G 1/0027; G07G 3/00; G06Q 20/203; G06Q 20/20; G06Q 20/208; G07F 19/202; G07F 19/207; G07F 19/00
See application file for complete search history.

(56) References Cited

U.S. PATENT DOCUMENTS

| | | | |
|---|---|---|---|
| 8,125,624 B2* | 2/2012 | Jones | G07D 7/20 356/71 |
| 8,459,436 B2* | 6/2013 | Jenrick | G07D 7/12 194/206 |
| 2007/0055590 A1 | 3/2007 | Kretzschmar et al. | |
| 2011/0106681 A1* | 5/2011 | Cockerell | G06Q 10/06 705/35 |
| 2012/0008131 A1 | 1/2012 | Jones et al. | |
| 2013/0148874 A1 | 6/2013 | Jones et al. | |
| 2014/0025514 A1 | 1/2014 | Bowden et al. | |
| 2014/0144976 A1 | 5/2014 | Angus et al. | |
| 2015/0178692 A1* | 6/2015 | Nishida | G07D 7/12 705/45 |
| 2017/0046651 A1 | 2/2017 | Lin et al. | |

\* cited by examiner

*Primary Examiner* — Sonji N Johnson
(74) *Attorney, Agent, or Firm* — Plant & Planet Law Firm

(57) ABSTRACT

The invention provided herein generally relates to devices, systems, and methods for handling cash or quasi-cash items in such a way as to substantially eliminate employee theft, error, or difficulties in reconciling a record of transactions with a total amount of money in a cash drawer. The invention also provides devices, systems, and methods for cash-collateralized electronic banking.

27 Claims, 9 Drawing Sheets

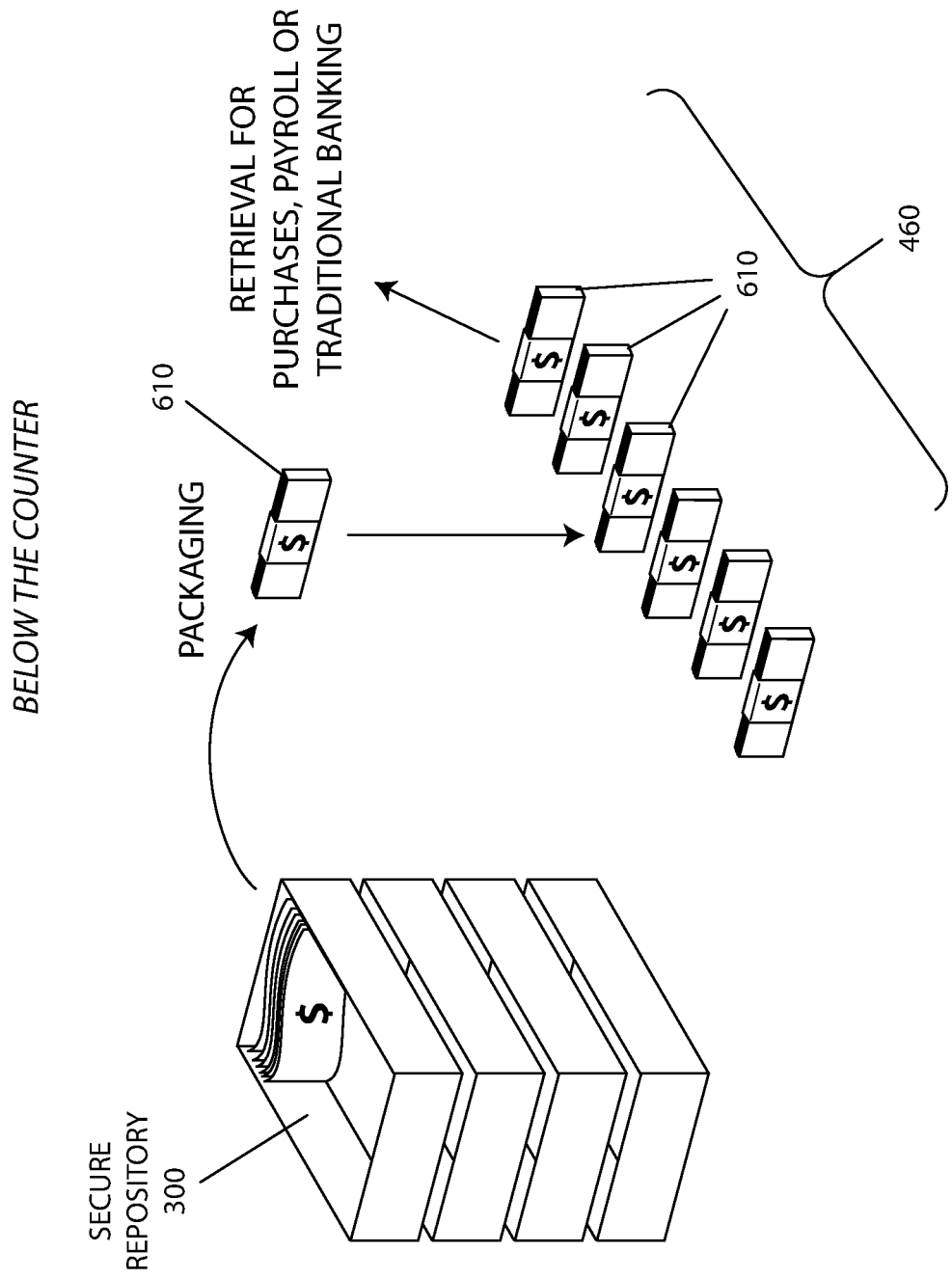

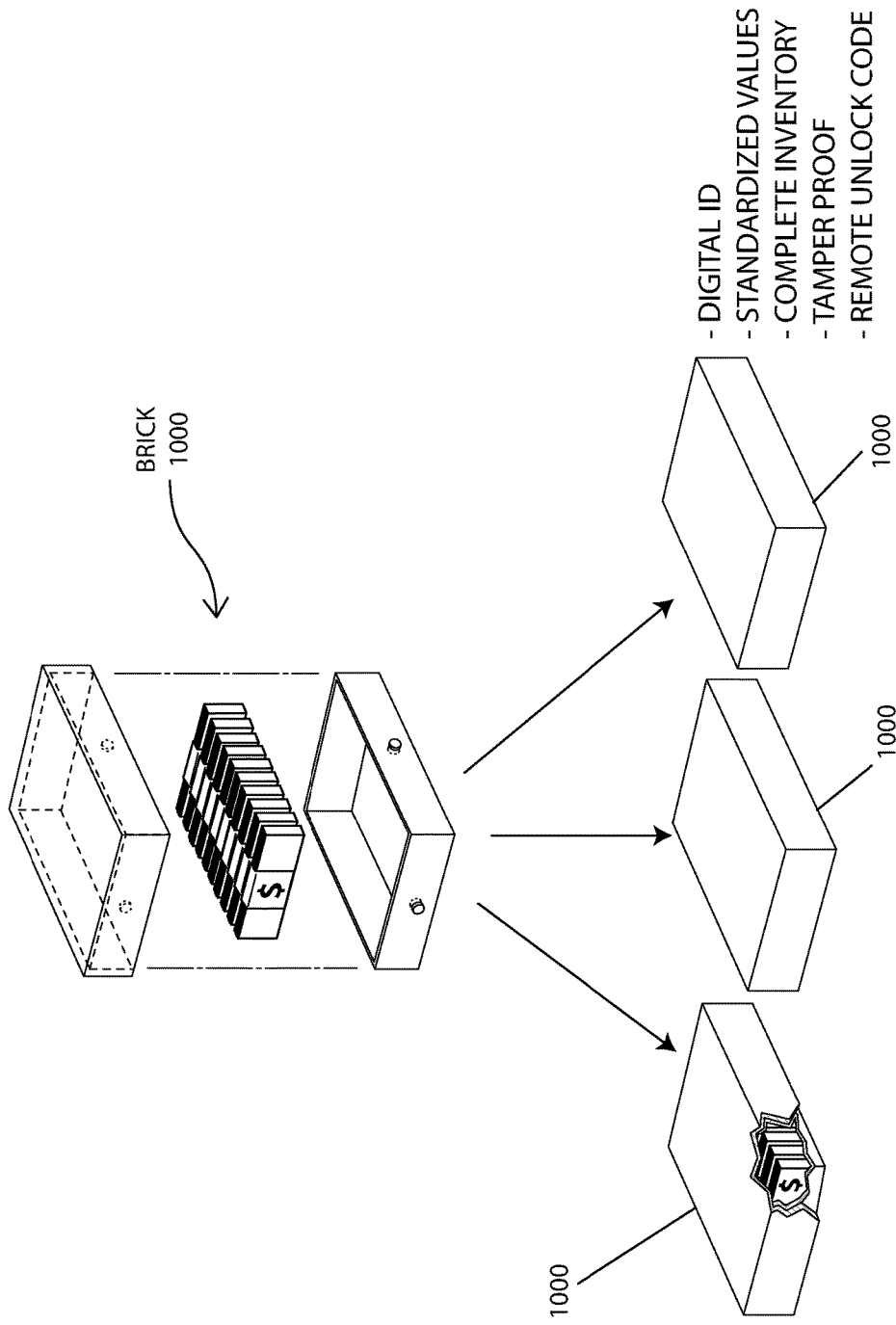

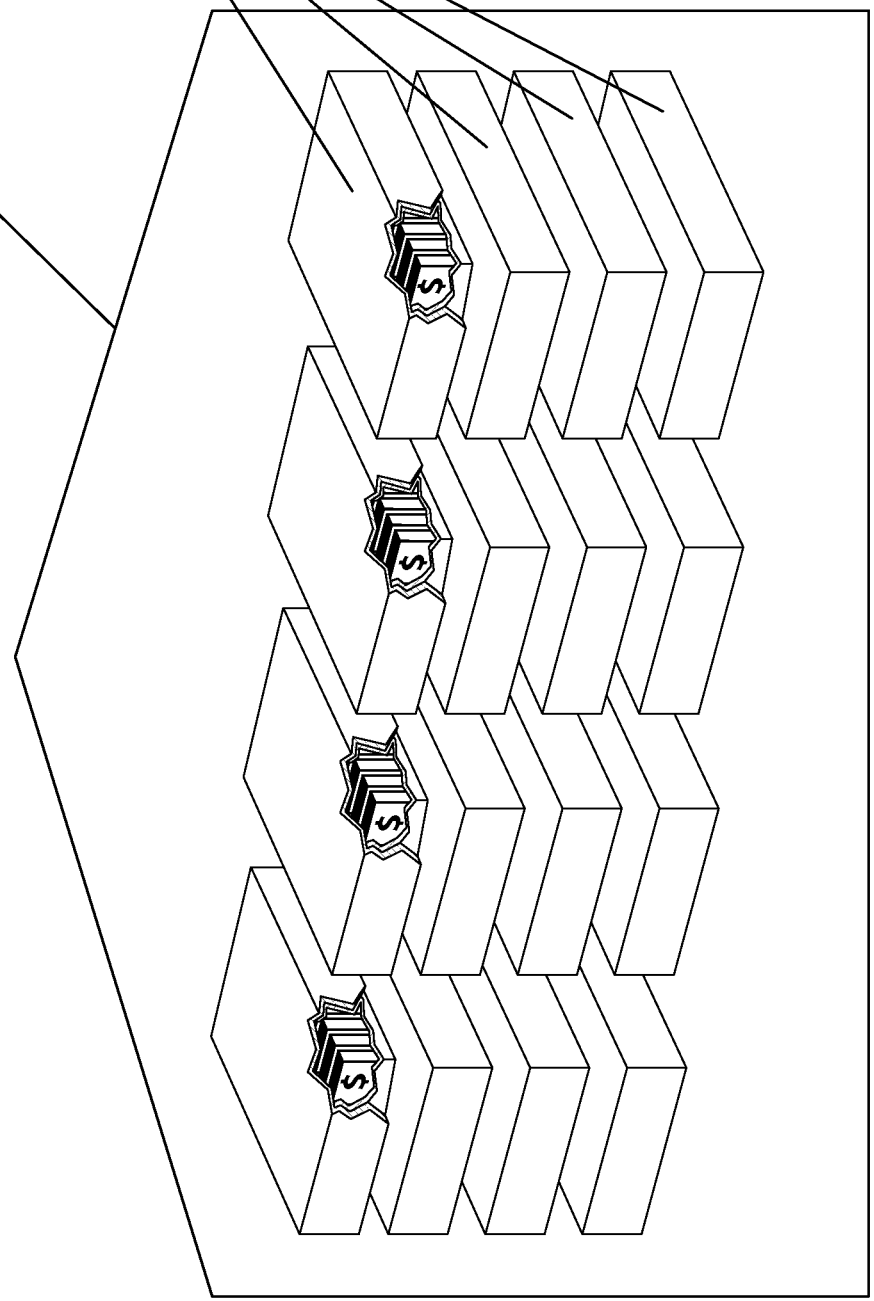

DIRECT-SCAN CASH-MANAGEMENT SYSTEMS AND METHODS

CROSS-REFERENCE TO RELATED APPLICATIONS

The present application is a U.S. National Stage entry under U.S.C. 371 of International Application No. PCT/US2019/045376, filed on Aug. 6, 2019, designating the United States of America and published in English on Jan. 24, 2019, which in turn claims priority to U.S. Provisional Application No. 62/715,198, filed Aug. 6, 2018, and U.S. Provisional Application No. 62/832,205, filed Apr. 10, 2019. The entire contents of each of the foregoing is hereby incorporated by reference herein.

BACKGROUND

Certain industries and commercial settings are more cash-intensive than others. In fact, some industries are exclusively cash-oriented, or nearly so. This includes, for example, aspects of the cannabis industry, based on the lack of convenient banking systems and conventions due to ongoing differences between federal and state law concerning cannabis. In addition, many other businesses and industries involve significant use of cash, including casinos, convenience stores, fast food restaurants, festivals, carnivals, fairs, and the like.

Use of cash is a frequent source of difficulties and provides opportunities for theft or costly mistakes. One major problem is that a business owner often has to hire people that he or she does not know well and has to place more trust in such employees to handle cash than may be merited. Some of the solutions for this security problem have been to place cameras directly above the cash-handling space in a business and to have very strict regulations regarding balancing cash drawers. Even in its best form, these approaches require significant effort in counting and sometimes recounting and adjusting for or accounting for errors in the differences between the amount of money in the cash drawer and the total tally for the day. These processes introduce numerous additional opportunities for mistake and fraud.

SUMMARY OF THE INVENTION

Provided herein, in certain embodiments, are devices and solutions for handling cash or quasi-cash items in such a way as to substantially eliminate employee theft, error, or difficulties in reconciling a record of transactions with a total amount of money in a cash drawer. Embodiments of the invention provide cash drawers that are secure, cannot be opened manually, and have one point of entry. At the point of entry, or intake portal, embodiments of the invention provide a scanner capable of scanning every item to capture its unique identifier and its value. Optional scanning can also test for whether the currency is counterfeit.

Advantages of keeping track of unique identifiers include: (1) creating a record of what exactly is in the system and within each collection of cash items either in "Dynamic Storage Package" (DSP, or "bundle") or in a "Static Storage Package" (SSP, or "brick") recorded in the system, (2) making each brick transferrable and fraud-resistant, (3) enabling banking-like functionality because the cash is safe collateral and not fungible, (4) preventing counterfeits, because each scanned item is unique and duplicates can be identified. In some embodiments, the system gives each item a unique identity from scanning the identifier located on or within the physical item. Thus, even if the physical cash is stolen, the record of item's identity can be provided to law enforcement and the items can be more easily located and returned.

A complete record of every item of currency entering the system is made by communicating the scan data for each item into a spreadsheet, database, or like computer system for organizing data (the data manager). A system inventory within the data manager retains records of all items, bricks, bundles, and transactions. In addition, accounting may be done in real time either within the cash-management system through internal functions or through integration with commercial accounting software. Optionally, change can be made by having an exit/output function as part of the primary repository. The output is only triggered after an input of an amount of currency that is in excess of the amount of the transaction. In the event that the change required is a fraction of a currency unit (the units being, e.g., dollars, and the fractions being, e.g., cents), additional output functionality can be provided. In an embodiment, an automatic coin dispenser controlled by the data manager counts the coins and dispenses correct change. The transaction is not complete until money is entered into the cash drawer and any change is given. Real-time accounting for money entering or leaving the cash-management system is accomplished through communication between the intake portal, the output function, and the data manager.

Embodiments of the invention reduces opportunities for human error or fraud. In some embodiments, the cash-management system also is capable of packaging like items of currency into packages containing a set number of bills, further facilitating handling of cash. In further optional embodiments the cash-management system can feed directly into a safe or vault or other secured storage area.

In practice, a cash transaction involves, for example, entering a total transaction amount into a cash register or like device in the cash-management system of the present invention; or a calculation of a total transaction amount derived from one or more purchase decisions entered into an interactive user interface; or the like. A buyer provides cash in an amount that is equal to or greater than the transaction amount. In some embodiments, this cash is provided to a cashier, who inserts the cash into the point of entry. In other embodiments, the buyer provides the cash directly to the point of entry. The point of entry scans each item to capture its unique identifier and value. A record of total cash in the cash-management system, as well as a record of all item identifiers contained within the cash-management system, is maintained in the data manager and updated in real time. In the event that the amount of cash entered into the cash-management system is greater than the transaction amount, change is provided by dispensing currency from the cash-management system through a dispensing slot that scans the currency leaving the cash-management system. The data manager reconciles not only the total amount of cash remaining in the cash-management system, but also the individual identity of items entering and leaving the cash-management system, such that the data manager provides both an accurate total of the amount of money in the cash-management system, and an inventory record of each individual item of currency. In alternative embodiments, the system does not deal with change, has only a limited pool of change, or rounds purchases to the nearest dollar (or other unit of currency) and provides the remainder to charities or other recipients.

The cash-management system can be linked to a permanent record-keeping system such as, e.g., a blockchain, to further reduce or eliminate risk of or opportunities for fraud in handling cash in the cash-management system. Linkage of data systems to blockchain systems is known within the art and is within the capability of a person practicing the invention.

Embodiments of the invention are particularly useful in cash-intensive businesses and functions such as the cannabis industry. The invention can also find great utility and acceptance in any other industry involving the handling of cash. The invention simplifies the handling and tracking of cash by directly creating an inventory of items of currency and a total cash value, and by optionally screening for counterfeit currency. This eliminates the need for additional levels of accounting, processes such as drawer-balancing or currency counting, and the security required when cash can be diverted from a transaction in an act of theft, fraud, carelessness, or simple human error. The invention can be used in any business that uses cash, for example, fast food restaurants, convenience stores, casinos, carnivals/fairs, etc. Embodiments of the invention are particularly beneficial in industries that are not permitted to participate in a conventional banking system, by permitting an all-cash financial system that is accurate, secure, and compatible with electronic transactions collateralized by tangible cash reserves.

Embodiments of the invention relate to a cash-management system adapted for handling of multiple items of at least one currency type. The currency of each type can have a plurality of predetermined value denominations. The currency of each type can further include a unique identifier, where the unique identifier can be unique to each item of currency within a currency type, such that each item of currency of a given type is distinguishable from every other item of once type. The system can include a user-interface stage. The user-interface stage can include an intake portal adapted to receive currency inputs from a user, where the intake portal can include a scanner capable of capturing item data from an item of intake currency; where the item data can include the item's unique identifier and the item's value denomination. The system can further include a processor adapted to receive, process, and transmit said item data to a system record, where the system record can include a system inventory of all currency items present in the system. The system can further include a sorter adapted to sort each item of input currency into one of a plurality of primary currency stores, where each primary currency store can correspond to the value denomination, such that after handling by the sorter each item of input currency is placed in a selected primary currency store according to the value denomination of said item of input currency.

In some embodiments, the user-interface stage can further include an output portal adapted to return output currency to a user. The output portal can include a scanner capable of capturing item data from an item of output currency, such that output currency is removed from the system inventory. The system can include a retriever adapted to retrieve a predetermined number of one or more denominations of currency from the appropriate primary currency stores to deliver the output currency through the output portal to the user.

In some embodiments, the intake portal and the output portal are the same, such that a single portal can be capable of fulfilling both intake and output functions.

In some embodiments, the items of currency can further include indicia of currency type, and the scanning, sorting, and record functions of the system can be adapted to handle currencies of a plurality of currency types.

In some embodiments, the plurality of currency types can correspond to plurality of national issuers of currency, and the primary currency stores can comprise a separate primary currency store for each value denomination within each currency type.

In some embodiments, the system can further include a dynamic currency storage stage in physical communication with the user-interface stage. The physical communication between the stages can include a dynamic packaging interstage. The dynamic packaging interstage can be adapted to select a predetermined number of currency items of like value denomination from a primary currency store and package the predetermined number of items in a dynamic storage package (DSP), each DSP having an assigned dynamic storage package identifier (DSP Identifier) unique to the DSP, and each DSP having a predetermined total currency value based upon the predetermined number and the value denomination of the DSP. The dynamic interstage can be further adapted to deposit each DSP, after packaging, into the dynamic currency storage stage. In connection with packaging and deposit of a DSP, the DSP Identifier can be communicated to the system record, and the DSP Identifier can correspond to a unique DSP sub-inventory of currency items within the system inventory, where the DSP sub-inventory is a subset of the system inventory.

In some embodiments, the dynamic packaging interstage can also include retrieval capability to retrieve a DSP and depackage the DSP and deliver currency from the depackaged DSP back to a primary currency store, or deliver the entire DSP to a user via a DSP-output in the user interface stage.

In some embodiments, upon depackaging, the DSP identifier can be removed from the system record and the unique identifiers are no longer associated with a DSP through a DSP identifier.

In some embodiments, the DSP identifier can be recorded as exiting the system and all associated unique identifiers are removed from the system inventory.

In some embodiments, the system can further include a payout ledger of DSPs or individual currency items outputted from the user interface stage.

In some embodiments, the dynamic currency storage stage can further include a banking deposit function, where multiple DSPs can be withdrawn directly from a portal in the dynamic currency storage stage in preparation for a bank deposit or other use of the currency within the DSPs.

In some embodiments, the DSP Identifiers and sub-inventories can be communicated to the bank and recorded in the system record as having been withdrawn from the system inventory for bank deposit.

In some embodiments, the system can further include a static packaging interstage. The static packaging interstage can be adapted to receive multiple DSPs and package them into a secure container as a static storage package (SSP) for containing currency.

In some embodiments, the SSP is adapted to be tamper-proof, fireproof, waterproof, EMP-proof, location-trackable, and/or the like, and/or any combination thereof. In some embodiments, the SSP can include a unique static storage package identifier (SSPID). In some embodiments, the SSP can contain a total amount of currency equaling a predetermined value.

In some embodiments, the SSP can include an unlock code required for opening the SSP. In some embodiments, the unlock code can be executable from a remote location.

In some embodiments, the unlock code can function in an unlocking device adapted to unlock the SSP. In some embodiments, the unlock code can function to unlock the SSP only when it is in physical contact with the unlocking device.

In some embodiments, the system further includes a static storage stage for secure storage of multiple SSPs. In some embodiments, the static storage can be adapted for input and output of SSPs via at least one portal. In some embodiments, the at least one portal requires one or more of an access code and a physical key for activation. In some embodiments, the static storage can be adapted to read and report all SSPIDs of SSPs contained therein.

In some embodiments, the system can include a sub-inventory of all items contained within the static storage. In some embodiments, the static packaging interstage is integral with the dynamic currency storage stage or with the static storage stage.

In some embodiments, the system can further include a centralized currency storage stage (CCSS) adapted to receive SSPs from multiple instances of the system for secure storage of the SSPs, where each instance of the system can be associated with a unique user of the system and/or a unique account within the CCSS, where the CCSS can be adapted to read and record the SSPID of each SSP associated with any instance of the system and/or with any account within the CCSS.

In some embodiments, the CCSS can maintain a sub-inventory of the currency contained in each account. In some embodiments, the CCSS can be further adapted to permit transactions between or among users of the system.

In some embodiments, each transaction can include a change in an ownership record associated with at least one SSP and/or at least one DSP within a given SSP.

In some embodiments, the transactions can be encrypted and remotely executable.

In some embodiments, information in the system is recorded in a blockchain.

Some embodiments of the invention relate to a cash-inventory system employing any of the features described herein.

Some embodiments of the invention relate to a cash-collateralized banking system, including any of the features described herein.

Some embodiments of the invention relate to a method of cash management. The method can include providing a cash-management system including at least one cash-handling portal comprising scanning capability. The method can include scanning all currency as part of a cash transaction, cash deposit, cash withdrawal, or any combination thereof, to record data relating to each individual item of currency, where the data includes data unique to each individual item. The method can include creating a cash inventory record treating each individual item of currency as a separate entry. The method can include updating the cash inventory record with each transaction, deposit, withdrawal, or any combination thereof.

In some embodiments, the method can further include sorting items of currency into like denomination.

In some embodiments, the method can further include packaging items of currency into a dynamic storage package (DSP) having a unique dynamic storage package identifier (DSPID) and having a sub-inventory of currency bundled into the DSP.

In some embodiments, the DSP can be adapted for temporary storage of currency and optional retrieval of currency from the DSP as required for withdrawals, transactions or any combination thereof, and concomitant adjustments to the cash inventory record.

In some embodiments, the method can further include packaging items of currency into a static storage package (SSP) having a unique static storage package identifier (SSPID) and having a sub-inventory of currency contained within the SSP.

In some embodiments, the SSP can be adapted for secure storage of currency. The SSP can be tamperproof, fireproof, waterproof, EMP-proof, location-trackable, and/or the like, and/or any combination thereof.

In some embodiments, the method can further include storing separately packaged, uniquely identified, and separately inventoried currency belonging to multiple users in a centralized secure facility.

In some embodiments, the method can further include maintaining an inventory of all currency in the facility where the inventory can associate a user/owner with the inventory record of each item of currency.

In some embodiments, the method can further include coordinating transactions between or among users, where the transactions can include updates to the inventory record reflecting a change in ownership of the currency.

Figure 1:
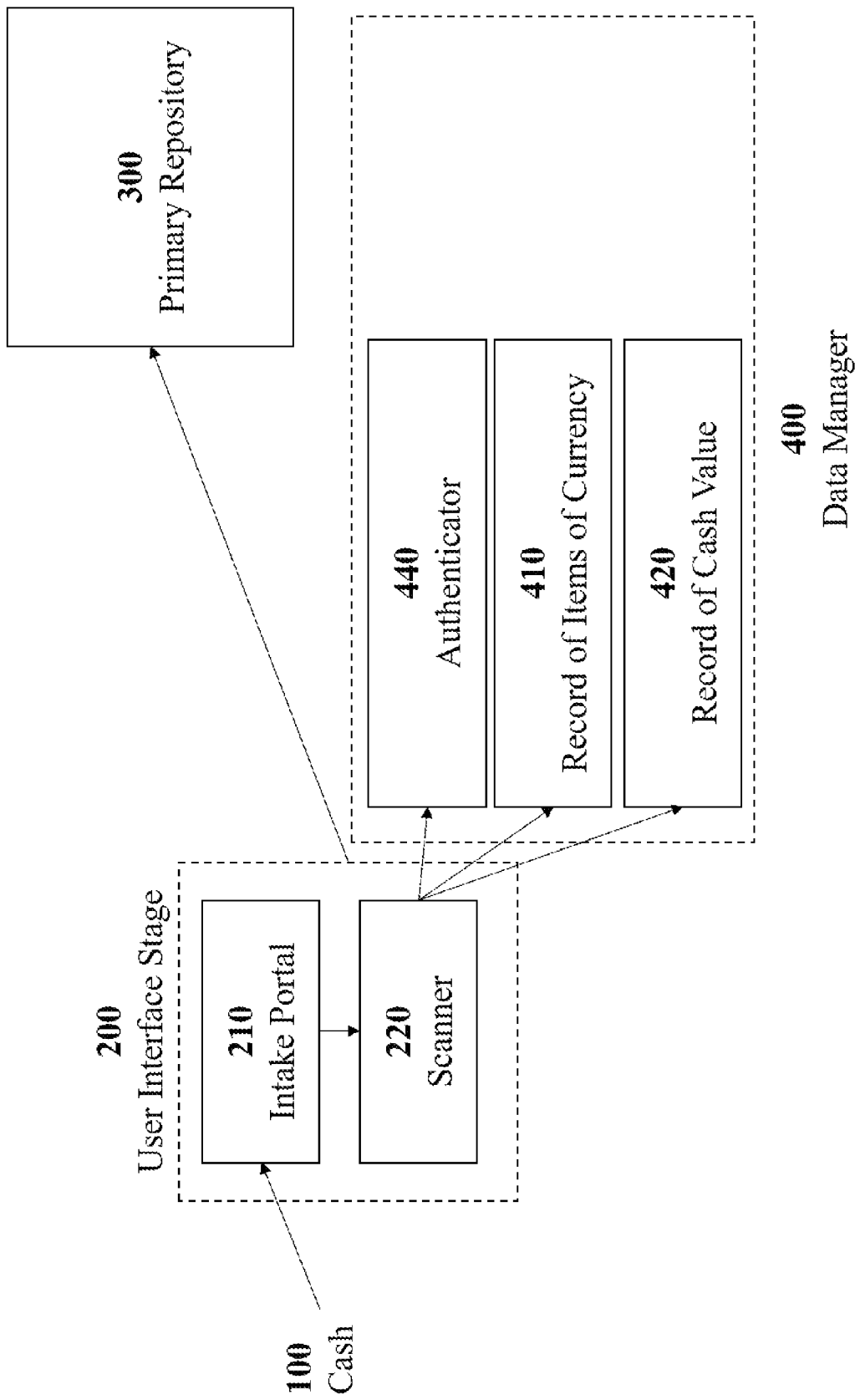
FIG. 1 shows the first part of a transaction utilizing a cash-management system embodiment of the present invention. Cash 100 is provided to the intake portal 210 of the user interface stage 200. The cash is passed from the intake portal 210 through the scanner 220. The scanner 220 records the value of each item of currency, and that data is conveyed to the record of cash value 420 within the data manager 400. The scanner 220 also records the unique identifier of each item and conveys this information to the record of items of currency 410. The scanner also optionally provides information to the authenticator 440 which verifies whether each item is counterfeit or legitimate. The physical cash is passed from the user interface stage 200 to the primary repository 300.
Figure 2:
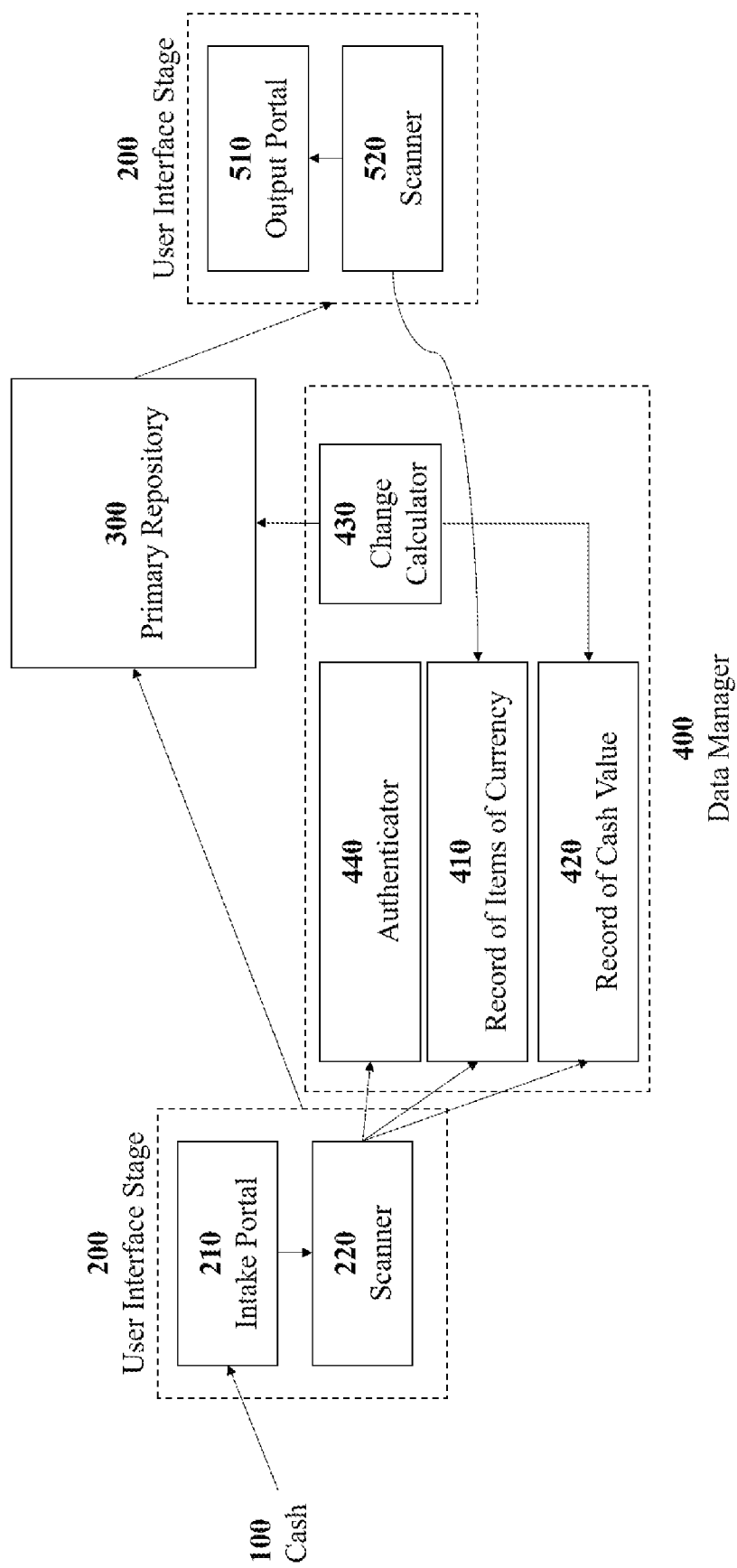
FIG. 2 shows a transaction which requires the making of change. The transaction proceeds as described in FIG. 1. The change calculator 430 determines the proper amount of change to be dispensed. The change calculator 430 communicates to the primary repository 300 the amount to be dispensed. The primary repository 300 provides to the user interface stage 200 the proper amount of cash. The scanner 520 scans each item as it exits the cash-management system and conveys the identity of each leaving item to the record of items of currency 410. The change calculator 430 provides information on the amount to be dispensed to the record of cash value 420. The physical cash is then provided to the output portal 510 at the user interface stage 200.
Figure 3:
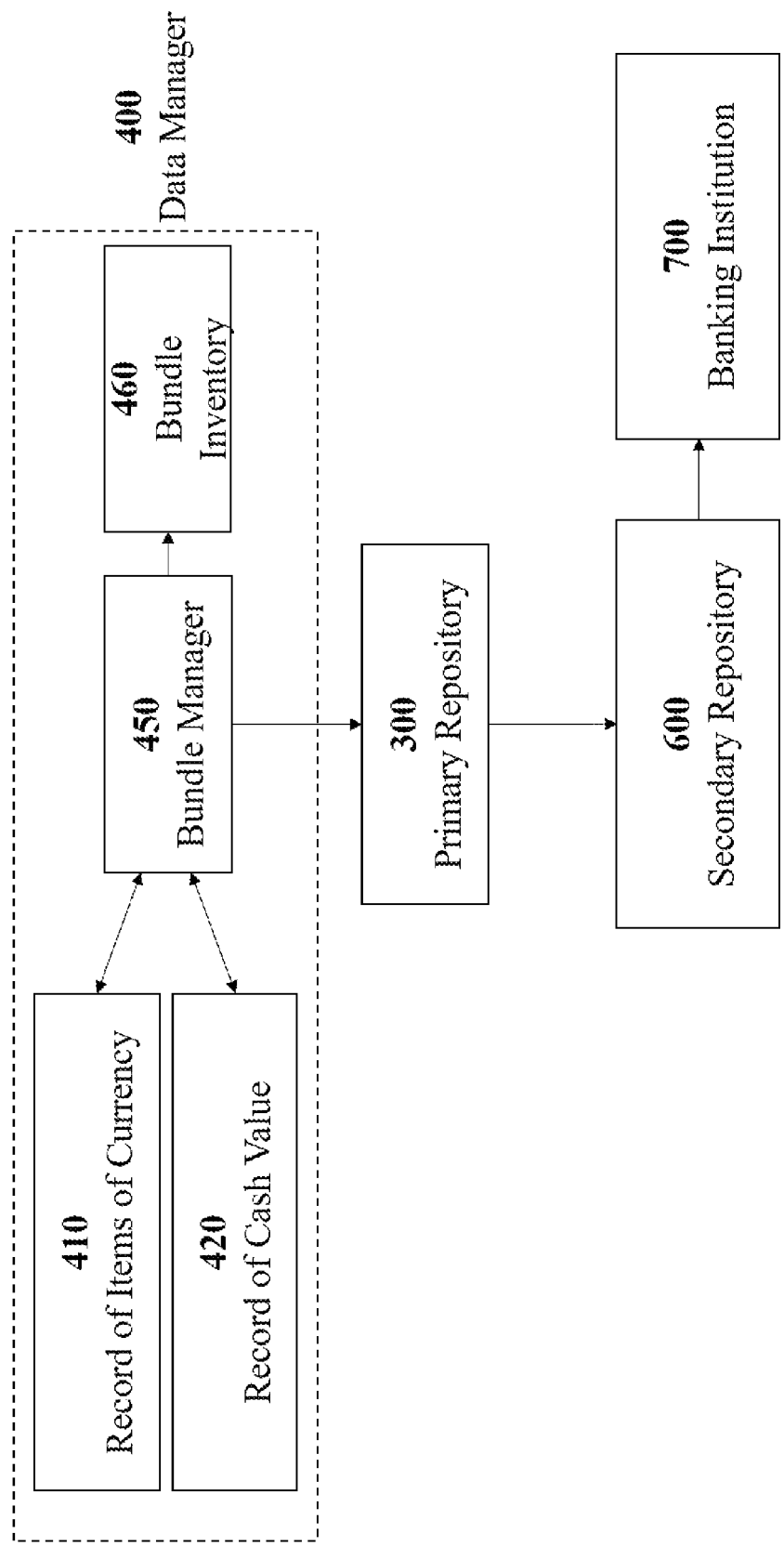
FIG. 3 illustrates movement of the cash from the primary repository 300 to a local secondary repository 600 for optional eventual bank deposit. The bundle manager 450 in the data manager 400 is programmed to create bundles of like items of currency in predetermined values. The bundle manager 450 communicates with the record of cash value 420 to determine when the bundling threshold is reached. The bundle manager 450 instructs the primary repository 300 to create the bundle(s). The physical bundles are then passed from the primary repository 300 to a local secondary repository 600. The bundle manager 450 communicates with the record of items of currency 410 to collect the identities of each item placed in the bundle. The bundle manager 450 conveys the identity of items within the bundle, a "Dynamic Storage Packet Identifier" (DSPID), and the cash value of the bundle to the bundle inventory 460. The bundles are kept in the local secondary repository 600 until they are optionally moved to a banking institution 700 for deposit, or accessed for transactions supported by the secondary repository, or moved from the secondary repository to Static Secure Storage.
Figure 4:
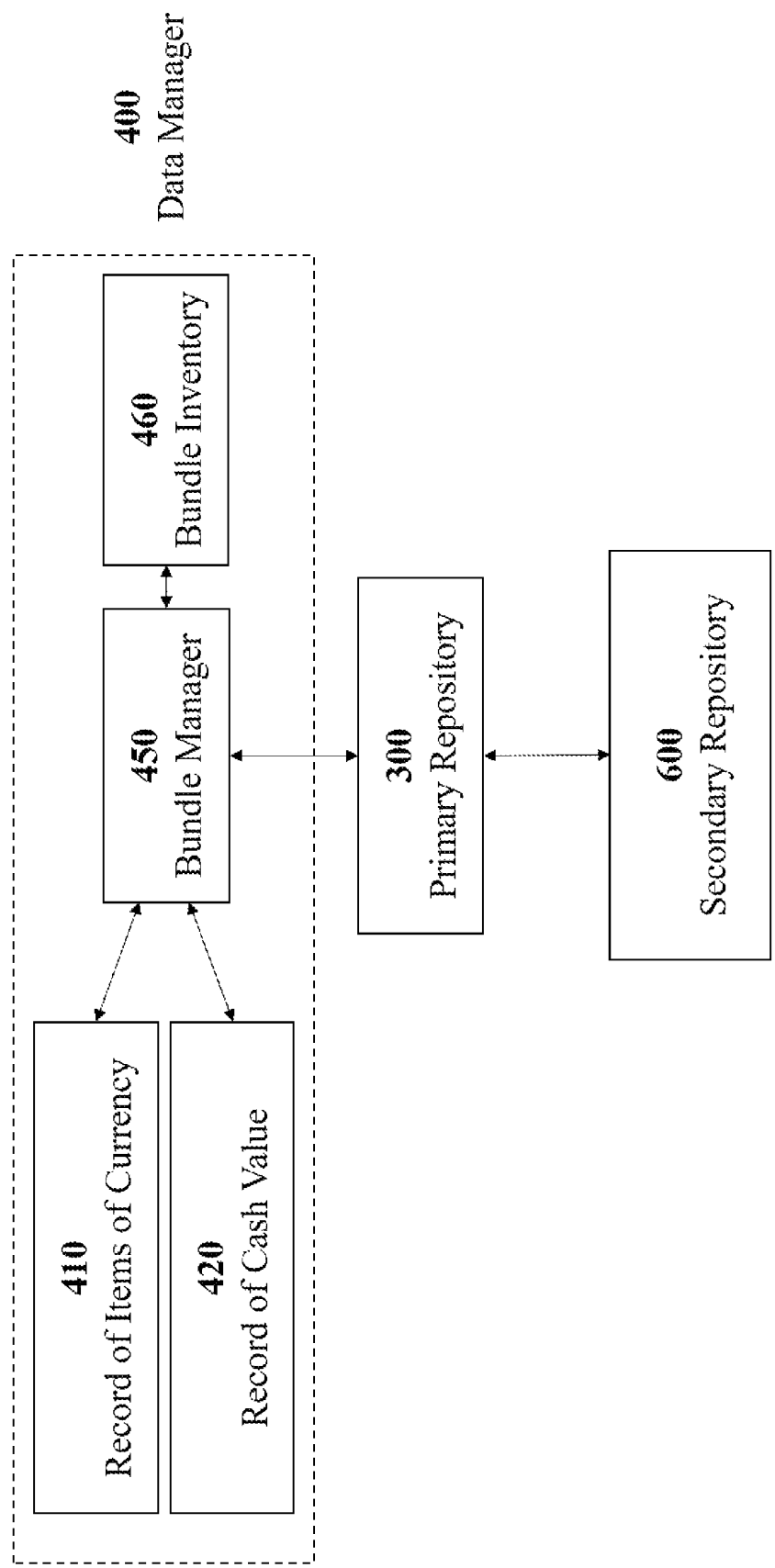

FIG. 4 illustrates movement of the cash from the primary repository 300 to a local secondary repository 600 when deposit with a banking institution is not the end goal. The initial bundling process follows that described in FIG. 3. However, in this embodiment the bundling process is reversible. Bundles may be removed from the local secondary repository 600 into the primary repository 300 and are unbundled either within the secondary repository or within the primary repository or in a bundling/unbundling system operating between the primary repository and the secondary repository. The bundle manager 450 communicates with the primary repository 300 to identify the bundle being unbundled by correlation with the bundle's DSPID. The bundle manager 450 communicates with the bundle inventory 460 to identify the cash value of the bundle and the identities of the items within that bundle. The bundle manager 450 conveys the identity information of the unbundled items to the record of items of currency 410. The bundle manager 450 conveys the cash value of the unbundled items to the record of cash value 420. The physical cash is removed from the local secondary repository 600 and passed to the primary repository 300.

Figure 5:
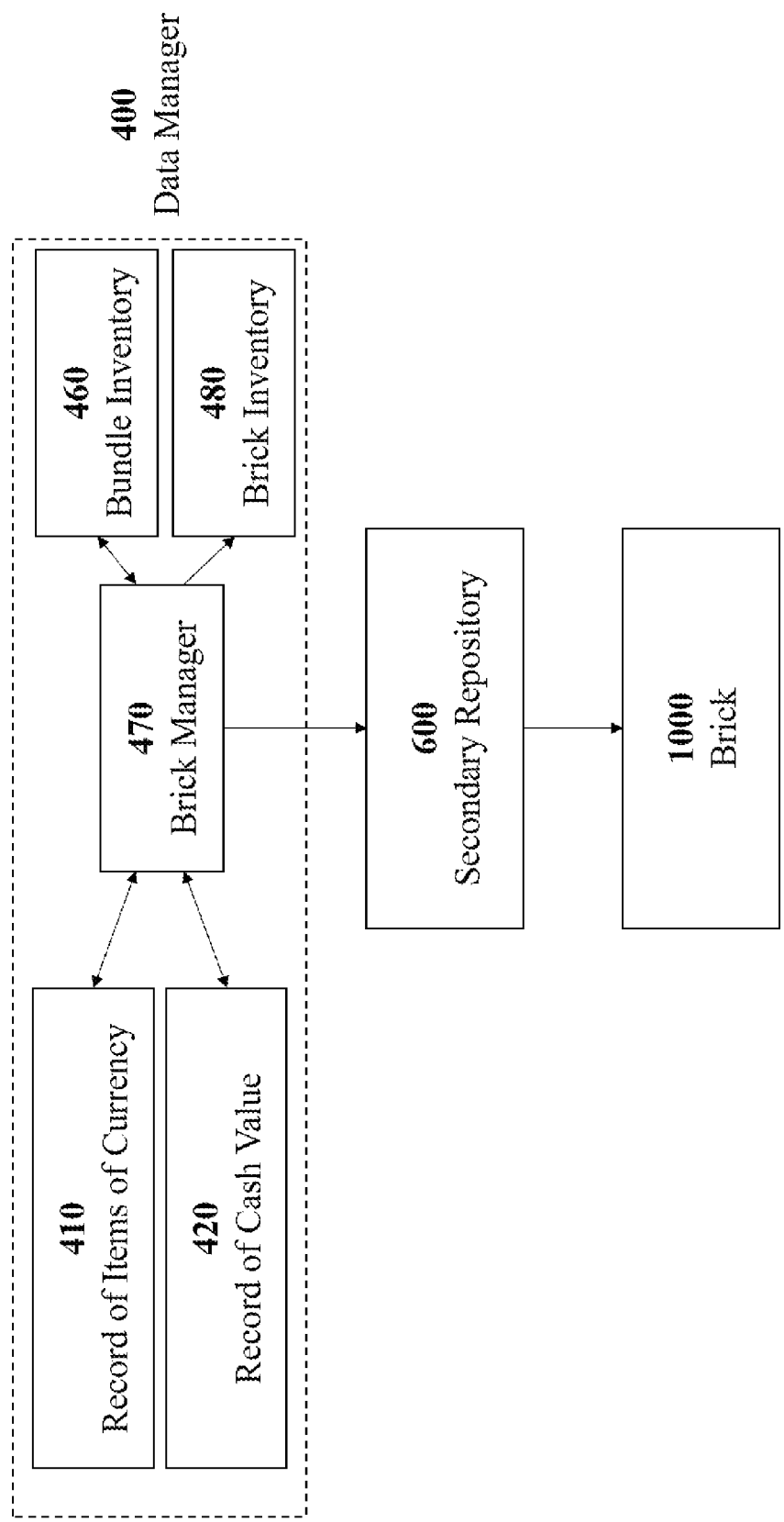

FIG. 5 illustrates a method for long term cash retention within the cash-management system. The brick manager 470 within the data manager 400 is programmed to create bricks of predetermined value from bundles within the local secondary repository 600. The brick manager 470 communicates with the bundle inventory 460 to determine when the brick creation threshold is reached. The brick manager 470 instructs the local secondary repository 600 to create a brick 1000 using bundles identified by their DSPIDs. The physical bricks 1000 can be moved as desired by the user. The brick manager 470 conveys the identity of the bundles in the brick 1000 to the bundle inventory 460 and conveys the identity all items in the brick to the record of items of currency 410. The brick manager conveys the total cash value of the brick to the record of cash value 420. The brick manager 470 conveys the identity of items within the brick, an identifying brick signature ("SPID"), a unique brick access code, and the cash value of the brick to the brick inventory 480.

Figure 6:
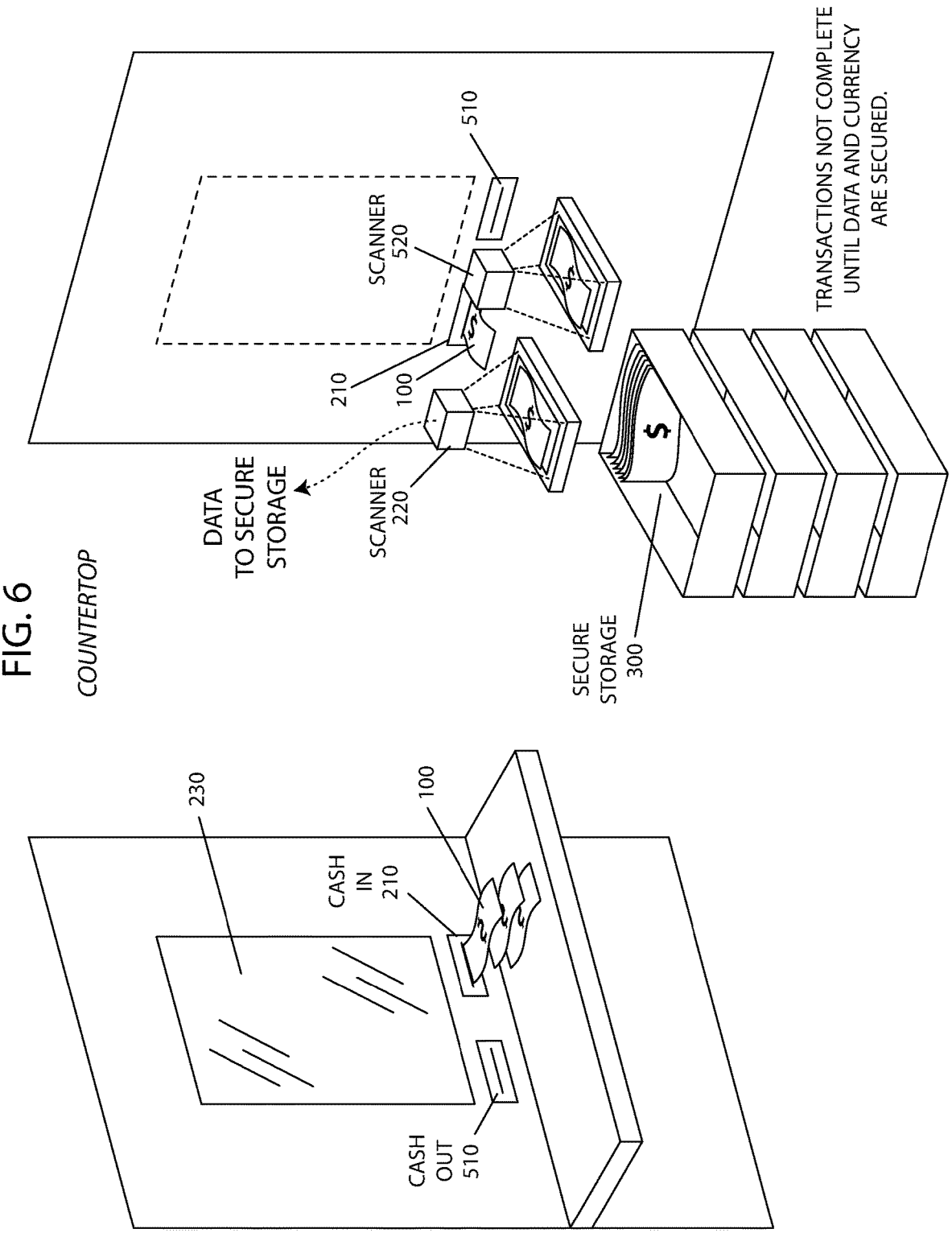

FIG. 6 illustrates a countertop embodiment of the first stage of the invention. A user interface screen 230 is provided to facilitate human use of the invention, such as providing a display of the products involved in the transaction and a transaction price. Cash 100 is inserted into the intake portal 210. The cash is passed to a scanner 220, which scans each item of currency for value, unique identifier, and other data. The scanned data is conveyed to the system inventory (not shown). After being scanned, the cash is passed to a secure primary repository 300. Transactions are not completed until data and currency are secured. When change is required, the proper amount of change can be removed from the primary repository 300 and provided to a scanner 520 which scans each item of currency to be dispensed as change for value, unique identifier, and other data. This data is conveyed to the system inventory and records are updated as appropriate. The cash is then provided to the user through an output portal 510.

FIG. 7 illustrates the bundling operations which occur below the countertop unit. One or more devices (not shown) are provided which collect cash in the amount to be bundled from the secure primary repository 300. The items within the bundle are recorded, along with the value of the bundle. After packaging, each bundle 610 is assigned a unique bundle identifier recorded in the bundle inventory 460. In some embodiments, the bundles 610 may be retrieved and unbundled to access the items contained within them to fulfill a wide range of business needs.

FIG. 8 illustrates the creation of a "Static Storage Package", or brick 1000. In this embodiment, the brick consists of two rectangular boxes with five sides, i.e. one side of each box is open. Cash is placed within the smaller box. The larger box is then secured over the top of the smaller box, resulting in a single box closed on all sides. The brick packaging may be comprised of a variety of materials and can comprise additional locking or security features. Each brick is assigned a "Static Storage Package ID" (SSPID) which identifies it within the system. The SSPID is associated with records of each bundle and item of currency contained in the brick. Each brick is assigned an access key that is required to open the brick and access the cash. Use of the access key destroys the validity of the brick within the system.

FIG. 9 illustrates the retention of multiple bricks 1000 as an alternative to traditional banking deposit. The physical bricks may reside in any location desired by the user, and title to the cash can be transferred by transfer of the SSPID and access key to one or more bricks.

DETAILED DESCRIPTION OF THE INVENTION

As used herein, "cash" refers to physical monetary instruments, embodied in bills, coins, and/or the like. Cash is inclusive of such physical monetary instruments as may be issued by any national or international authority. Cash is also inclusive of quasi-monetary instruments, such as casino chips or physical instruments backed by digital currency or cryptocurrencies, as may be issued by any entity. Each of said individual physical monetary instruments is known as an "item of currency". Items can be classified based upon type of physical embodiment, national issuer, and/or the like. Each item carries a value denomination, and can further carry identifying indicia, such as serial numbers, embedded RFID signatures, and/or the like. In combination, these characteristics represent a data profile for each monetary instrument. For example, a United States one-dollar bill can have a data profile as follows:
Type: United States Bill
National Issuer: United States
Value Denomination: 1 United States Dollar
Serial Number: E19066540H The main concept of the system is to treat all pieces of currency as unique items of inventory carrying valuable data. The error and problem of prior cash-handling systems is the treatment of cash as fungible. This creates opportunities for fraud, mistake, and theft. But for each item of currency with a unique identity due to having a unique identifier, scanning technology makes it completely unnecessary to treat all items currency as fungible. Treating each item of currency as a discrete inventory item also significantly reduces the ability to counterfeit or duplicate known items of currency within the system. All currency in a transaction can be treated as unique items of inventory carrying valuable unique data. An early step in any transaction according to embodiments of the invention is to capture the data from each item of currency into a data stream. That data stream can further optionally be rendered secure and hackproof via blockchain or other secure technology. The system is concerned that each item is a unique individual with a unique identity and therefore each item's location in the system can also be tracked, whether the item is in a primary repository, a bundle within a secondary repository, or a brick; likewise the location of each bundle and each brick can also be tracked. In some embodiments a brick can be assembled to contain "loose" cash—i.e., cash that has not previously been packaged into DSPs. In such embodiments the inventory of the brick can be an inventory of each item of currency but does not include any DSPs and hence does not include any DSPIDs or other information relating to DSPs such as a DSP sub-inventory.

The invention can be embodied in different forms. For example, the invention can relate to a traditional cash register with two slots: an intake scanning slot & an output scanning slot, where a cashier can operate the cash register by interacting with its user interface, such as by pressing keys. As another example, the invention can be configured in a way that is similar to an ATM, having a touch screen operated by the user without requiring a cashier, where the user can interact with touch screen and can input and retrieve money directly through a single point of interaction capable of scanning items of currency in and out of the system, or via an input portal/scanner and an output portal/scanner. The user interface can be configured to achieve additional functionality, such as display of products to be sold, quantities and prices of said products, displaying user or customer account information, allow modification of the transaction or transactions, and more. The user interface can be configured to accept input and provide information verbally, through the use of keys, through use of a touchscreen, and more. In some embodiments, additional user interfaces can be provided for "back of house" settings, which allow review of information in the system record, such as total value, inventory of items of currency, activity data, and more without being directly tied to an intake or output portal.

The system can include two-factor authentication. The system can include bio-authentication. For example, some embodiments can include user verification capabilities in the user interface such as thumbprint and/or retina verification and/or facial recognition and/or voice recognition, and/or the like.

The cash repositories of the system can be designed to have desired characteristics. These characteristics include, but are not limited to: secure (in that the repository cannot be carried away), tamperproof (in that the repository cannot be opened without authentication), fireproof (in that the repository is resistant to or impervious to fire), waterproof (in that the repository is resistant to or impervious to penetration by water), blastproof (in that the repository is resistant to or impervious to alteration or breach by explosives or ballistics), and EMP-proof (in that the system is resistant to or impervious to any effects of a electromagnetic pulse otherwise capable of damaging or de-activating electronic devices). In some embodiments, cash is stored in an airtight container. In some embodiments, a set amount of bills can be vacuum sealed for efficiency and safekeeping.

The data manager and records within the system can also be designed to have desired characteristics, such as EMP-proof (in that the data will not be destroyed upon exposure to an electromagnetic pulse), offsite backup (in that the data is stored either on a cloud platform or remote servers), and blockchain interface (in that the data manager can interact with blockchain protocols to enhance security).

Four Stage System Embodiment

The following is an embodiment of the system that includes 4 stages. The system can also comprise any 1, 2, 3, or 4 of these stages.

Stage 1—Countertop Cashier-Facing Device Like a Cash Register or Customer-Facing Device Like an ATM A intake portal is provided which is capable of accepting cash. The user inserts cash into the intake portal. The cash is passed from said intake portal to a scanner capable of capturing information from the items of currency. The scanner scans each inserted item of currency for value and unique identifiers. The scanner can also scan the items of currency to verify their authenticity. After scanning, the items of currency pass to a primary repository, such as a drawer. In particular embodiments, a plurality of primary repositories are available to accept cash after it has passed through the scanner. Within each of the plurality of primary repositories is a plurality of currency store areas, and at least one device capable of sorting the items of currency based on one or more characteristics of that item. For example, the device can be capable of sorting the items of currency based on value denomination or national issuer. The items are sorted for storage within the primary repository, with each of the plurality of stores within the primary repository corresponding to a particular characteristic or set of characteristics of the items. In some embodiments, the items with like value denominations are stored together. In other embodiments, items of like national issuer are stored together. In particular embodiments, the primary repositories possess desired security features such as physical indestructability and multi-factor authentication for opening. In some embodiments, the transaction cannot be completed until cash is inserted which meets at least the transaction price, reducing opportunities for theft, fraud, or error.

The information captured by the scanner for each item of currency is passed to a data processor which creates a record for each item scanned. The record can comprise the item's value denomination, unique identifier, and more. An inventory is kept within the data manager of the total cash value and all individual uniquely identified items of currency contained within the system. Records are passed from the scanner through the data processor to the data manager for inclusion in the system inventory. Additional transaction information (such as product sold and consumer identity) can be captured and retained by the data manager as desired. In some embodiments, the system inventory is maintained in real time. In some embodiments, the scanner and data manager further compare the identity of each item against a database of known items to verify that the item is authentic, rendering payment with counterfeit items nearly or entirely impossible.

The device further possesses the ability to dispense cash from within the system. Cash can be dispensed in the form of making change at the end of a transaction, where the data manager calculates the amount of change to be dispensed. Cash can be dispensed upon request from the user, for example in an ATM-like embodiment where the user, through the user interface, enters a desired amount of cash to be dispensed, and such amount is transferred to the data manager. Each of the plurality of primary repositories is equipped with at least one device capable of retrieving items of currency as required for dispensing. When dispensing is required, said retrieving device retrieves items of currency in the amount specified by the data manager ("output currency"). The retrieved items are passed through a scanner capable of capturing item data from the items of currency. In some embodiments, this scanner is the same scanner through which items are passed from the intake portal. In some embodiments, this scanner is distinct from the scanner connected to the intake portal. The item data of the output currency is recorded by the scanner, and the records in the data manager are updated to reflect the value of cash dispensed and the identities of the items of currency which have left the system. The output currency is provided to an output portal, where it becomes accessible to a person using the system. In some embodiments, the output portal is a device which also serves as the intake portal. In some embodiments, the output portal is distinct from the intake portal.

Stage 2—Dynamic Packaging and Storage of Accumulated Cash

The plurality of primary repositories retain enough cash to fulfill routine transactional needs dependent on industry and business type. Cash in excess of these needs proceeds to the second stage of the system: dynamic storage. Collections of items are sorted and grouped into dynamic storage packets ("bundles"). A bundle contains a predetermined total cash value and can be made up of any number of items of the same or differing value denominations. Bundles can be made up of items of currency possessing distinct or similar characteristics in their type or item data. Bundles can accomplish the physical grouping of the items in a variety of ways. For example, in a bundle of bills, the bills can be wrapped with a currency strap. For example, a bundle of bills can be vacuum sealed in plastic. For example, in a bundle of coins or coin-like items, the items can be placed in a sleeve which is then closed at both ends, similar to a traditional coin roll. For example, items of currency can be placed in sealable container which can then be moved between stages.

Bundles are formed during a dynamic packaging interstage. This process ("bundling"), can be set to occur at predetermined times, such as shift changes or close of business, or at predetermined amounts of total cash or number of items of currency of a given denomination. For example, bundling can be set to occur whenever 50 bills of like denomination are present in the primary repository. Alternatively, a bundling event may be triggered when a predetermined threshold is reached, such that a portion of the existing bills are bundled for dynamic storage and a reserve cache of other un-bundled bills remain in the primary repository for further transactions. Within the primary repository, a device or devices capable of retrieving items of currency is provided. The retrieving device or devices retrieves items with a total value equal to the value of the bundle to be created. The retrieved items are provided to a scanner capable of capturing item data from each item. Following such scanning, the retrieved items are then passed to a device configured to physically group the items into a bundle.

Each bundle is assigned a dynamic storage packet identifier (DSPID) upon creation. This identifier is comprised of a unique digital signature assigned by the data manager. A list of each DSPID is maintained in a dedicated inventory of DSPIDs, where said inventory is a sub-inventory contained in the system inventory. The DSPID is recorded with a value in said sub-inventory. In some embodiments, the value of a bundle is encoded in the DSPID. During bundle creation, a record is made of each item of currency, such as value denomination, identifier, national issuer, and other item data, that is included in the bundle. Each DSPID is linked to the record of items within the bundle bearing the respective DSPID. Through this, a user can identify each and every item of currency in any given bundle through that bundle's DSIPD. The DSPID is physically attached to the bundle, for example by a barcode or QR code stamped on the binding of the bundle or an RFID chip included in the bundle, or the like. The DSPID remains associated with and travels with the bundle until the cash is unbundled.

Once formed, bundles are transferred to a separate secondary repository. In some embodiments, the secondary repository is located directly underneath the cash drawer. In other embodiments, the secondary repository is located elsewhere in the business facility, such as in a basement or a vault. In some embodiments, the transfer of bundles is achieved through automated mechanical means. For example, in an embodiment where the secondary repository is located directly underneath the primary repository, the device which physically groups the items can be further configured to pass the formed bundle through a slot between the primary and secondary repository. For example, in embodiments where the secondary repository is remote from the primary repository, bundles can be conveyed to it by a network of vacuum tubes, conveyors, and/or the like. In some embodiments, the transfer of bundles involves human input. For example, formed bundles can be located in a distinct storage area within the primary repository, and upon a human user pressing a button on the user interface, the formed bundles are dropped from the primary repository to the secondary repository through a trapdoor-like opening connecting the two repositories. In some embodiments, a human can physically move the bundles from the primary repository to the secondary repository. The secondary repository can be provided with significant security features consistent with best practices. Cash is retained in the secondary repository until it can be moved to a bank or utilized for the payment of business expenses, such as rent, cost of goods, or payroll.

Stage 2A—Bank Deposit (Terminal Stage for Users Wishing to Deposit in a Bank)

When the terminal goal of the system is depositing the items of currency in a bank, the transfer of bundles from the primary repository to the secondary repository is, in most embodiments, irreversible. The DSPID can optionally be transmitted to the user's bank when the bundle is created. By transferring the DSPID, the bank recognizes that the user possesses an amount equivalent to the bundle(s).

Flow of cash from Stage 1 to Stage 2A is unidirectional. In some embodiments, at the end of a cash cycle, such as the close of business, a shift change, or any other pre-set period, some or all of the cash in the primary repository can be bundled and transferred to the secondary repository even if no other predetermined bundling threshold has been reached. Bundles created in this way are assigned a DSPID, and that DSPID is linked to the record of item data for the items contained in the bundle, just as in regular bundle creation. Bundles created in this way are additionally recorded as having a distinct value, equal to the value of the items of currency contained within the bundle. The DSPID, irregular value, and record of item data are stored in the DSPID sub-inventory just as in regular bundle creation.

The system is configured to allow removal of bundles from the secondary repository, such as when a code is entered or at the end of each business period such as, for example, a day or a week. The bundles with DSPIDs are physically removed from the secondary repository and delivered to the user's bank, where verification of amounts already in the bank's possession and/or delivered with the bundles. Because the DSPID is associated with discrete items of currency, there is no need to remove items for bank deposit on an item-by-item basis. In some cases, the bank can unbundle the cash for its own purposes, and the information on the destroyed bundles can be expunged from the system. In other cases, the bank can retain the cash in the bundled state, incorporate the bundle's associated information into its own systems, and/or facilitate further transactions using the bundle(s). In some embodiments, the system inventory creates and retains a record of all bundles and items of currency which have been deposited into a bank.

Some embodiments of the invention provide a cash inventory and tracking system, without regard to the mechanical features by which the inventory is created and/or security provided. In these embodiments, cash is scanned for creation of the inventory, whether in a system as described herein or in any other system capable of scanning and capturing the relevant data for a cash inventory system. In some embodiments, cash having been thus inventoried is bundled and a DPSID is created for the bundle, to facilitate tracking of a group of bills in the system. The system can include data for movement of bundles within the system, such as movement within a bank, a private vault system, or the like. In some embodiments, bundles and/or loose inventoried bills are packaged into bricks to secure larger value amounts for ease of tracking and transport without risk of loss, theft, fraud, or damage by fire, water, or the like.

Some embodiments of the invention provide a cash-based banking system wherein transactions are collateralized by cash inventoried according to the cash inventory and tracking system of the invention. The banking system can further include one or more locations for centralized storage of cash collateral in the form of bricks and/or bundles and/or loose, inventoried, bills. The banking system can be adapted to permit electronic transactions in which parties trade title to the bricks and/or bundles and/or individual bills by trading electronic information permitting control over and access to the bricks and/or bundles and/or individual bills. The difference between this banking system and conventional banking systems is that the transactions are collateralized by specific, unique items of cash in inventory rather than by cash equivalents or claims on deliverable but fungible value units. In the system, each and every brick, bundle and/or loose bill is a unique item of property personal to one party in the transaction and title to those specific items of property is transferred by transfer of electronic information permitting real-time transactions between parties anywhere in the world. In this system, a party receiving payment by obtaining title to specific bricks, bundles, etc., can then claim physical possession and delivery of these items or can maintain a ledger of such items of property for other transactions.

Transactions and related data can be handled, tracked, and secured by approaches known in the art and can be rendered hackproof via use of blockchain technology, encryption, or the like.

Stage 2B—Passthrough (Non-Terminal Stage for Users Wishing to Keep Cash on Hand)

When cash is to be retained, either because this is desired or because the system's user cannot access traditional banking services, the transfer of bundles from the primary repository to the secondary repository is reversible.

Flow of cash from Stage 1 to Stage 2B is bidirectional. Functionally, Stage 2B is the user's local bank or is equivalent to the user's checking account. When a vendor delivers goods or presents an invoice for services, and/or when the user must pay one or more employees, and/or when the user must make a tax payment, or the like, it becomes necessary for the user to retrieve an amount of cash that is greater than would be available in Stage 1 for register-level transactions.

The user in need of retrieving cash from the secondary repository can interact with the user interface and indicate the amount desired to be extracted from the secondary repository. In some embodiments, the secondary repository is equipped with a device or devices which can identify one or more bundles, wherein said bundles contain at least as much value as the total value to be distributed. Said devices are further configured to provide the bundles to a scanner, which scans the DSPID. In further embodiments, said device or devices then provide the bundle or bundles to the user through a bundle output portal. In further embodiments, said devices are capable of providing the bundles to one or more devices which physically separate the items of currency, thereby depackaging the bundle. The items of currency are then provided to the user through the output portal. In other embodiments, the user is granted access to the secondary repository and physically removes a bundle or bundles which contain at least as much value as the total value to be distributed. The user can scan the DSPID of each bundle removed.

When a DSPID is scanned during the removal, the data manager can update the records of bundles on hand to remove the bundles associated with the scanned DSPID(s) from the bundle sub-inventory. The data manager can also remove from the system inventory the records of the items of currency contained in each bundle which is scanned out. From the system's perspective, the bundle has been destroyed, and all the items contained within the bundle are no longer present in the system. The removal of the bundles and items can be reflected in the total cash value and record of items of currency in the system inventory. In some embodiments, these values are updated in real time upon the scanning out of a bundle. The user can hand over physical cash as required for the transaction. Cash remaining in the user's possession after the transaction is completed can be returned to the system through Stage 1. In some embodiments, the system can be configured to allow bundles to be scanned into the system as bundles rather than individual items of currency, where the system inventory and bundle sub-inventory are updated accordingly. In some embodiments, the system inventory creates and maintains a payout ledger containing an ongoing record of all bundles and items of currency which have been outputted from the system. In some embodiments, the payout ledger can retain additional information, such as the reason for the output or to whom the outputted currency was provided. In some embodiments, this payout ledger can interface with other systems or other instances of the present invention to assist in verifying transactions.

Stage 3—Static Packaging and Long-Term Storage

In Stage 3, a plurality of bundles are physically packaged together into a static storage package for long-term retention of large quantities of cash. Said static storage packages ("bricks") can comprise any container or method of physically retaining the bundles. The bricks can be configured to have desired security characteristics, such as being fireproof, tamperproof, waterproof, EMP-proof, physically indestructible, and/or the like. Each brick has a preset value such as, for example, $25 k, $50 k, $100 k, $250 k, $500 k, $1M. In some embodiments, the system can aggregate bricks of smaller value into bricks of larger value. For example, ten bricks, each with a value of $100,000, can be aggregated into a brick with a value of $1 million.

The formation of bricks can be achieved in a variety of ways. The principal steps comprise selecting at least two bundles with a value equal to the value of the brick to be created, retrieving said two or more bundles from the secondary repository, scanning the DSPIDs of each of the two or more bundles, and physically packaging the two or more bundles into the brick. In some embodiments, the secondary repository is provided with one or more devices configured to carry out the steps of brick formation. In some embodiments, a separate device or set of devices is provided which is capable of carrying out the steps of brick formation, and the bundles are provided from the secondary repository to the separate device, where the provision is facilitated by a device, devices, or by human means.

Upon creation, bricks (Static Storage Packages) are assigned a unique identifier, a Static Storage Package Identifier or SSPID. This identifier is comprised of a unique digital signature assigned by the data manager. A list of each SSPID is maintained in a dedicated inventory of SSPIDs, where said inventory is a sub-inventory contained in the system inventory. The SSPID is recorded with a value in said sub-inventory. In some embodiments, the value of a brick is encoded in the SSPID. During brick creation, a record is made of each bundle that is included in the brick. This record further contains a record of each item of currency, such as value denomination, identifier, national issuer, and other item data, that is included in each of the bundles. Each SSPID is linked to the record of bundles and items within the brick bearing the respective SSPID. Through this, a user can identify each and every bundle and item of currency in any given brick through that bricks's SSIPD. The SSPID is physically attached to the brick, for example by a barcode or QR code stamped on the exterior of the brick or an RFID chip included in the brick structure, or the like. The SSPID remains associated with and travels with the brick until the brick is accessed. In embodiments where bricks are aggregated, a similar process is followed, where a record is made of every brick, bundle, and item which is contained within the aggregated brick. In some embodiments, the SSPID is encrypted. In some embodiments, the SSPID can include or be linked to records of additional information, such as the physical location of the brick. Through the SSPID, an amount of physical cash is effectively converted to a single identifier, enabling easy transfer.

Bricks are secured against physical opening once formed. Bricks can be secured such that they can only be opened with a unique code, by a physical key, by an electronic signal transmission, and/or the like (any of such means a "key"). Without the key, a person cannot access the cash within the brick. Therefore, the individual possessing the SSPID and key associated with a particular brick possesses effective title of the cash contained in that brick. In some embodiments, using the key and accessing the brick creates an event that is saved to the data manager and destroys the integrity of the brick. In some embodiments a brick can only be opened in a designated facility or using designated hardware. In such embodiments, for example, a brick is engaged with the opening hardware and an unlock code is transmitted to the hardware or is physically entered into the hardware. Upon entry of a correct unlock code, the hardware reverses or deactivates the locking mechanism making the brick impenetrable and the brick is thus opened. In some embodiments, the physical act of opening the brick causes a communication with the inventory system to record that the brick no longer exists as such and that the items within the brick are removed from the inventory. The SSPID record is updated to reflect that the associated brick has been accessed and is no longer recognized as a brick within the system. The records of DSPIDs and items of currency that were contained within the brick are updated to reflect that the bundles and items contained in the brick have left the system. Once the brick is opened, it becomes a box of cash with no "brick nature" ever again. In this way, a brick is analogous to an egg: it can only be opened once and can never be recreated or returned to its original state. Once a brick is opened, cash must be returned to the system as items of currency, bundles, or smaller bricks, by scanning such items, bundles, or bricks back into the system, which can cause said items, bundles, or bricks to be assigned new identifiers within the system inventory.

The physical bricks can be stored in any location desired by the user. The location of the bricks can be provided with additional security measures to safeguard the bricks. In some embodiments, the bricks are stored in a container meeting standard shipping dimensions to facilitate easier transportation of the physical cash. In some embodiments, the bricks can be moved by an armored car integrated with the cash-management system capable of tracking the brick SSPIDs and locations. In some embodiments, the bricks can be stored at a warehouse designed with security features to be a safe repository for bricks. Said warehouse can be owned or operated by the party owning the bricks within, or by a third party. Thus, a user can maintain on or more collections of bricks as a private vault or vaults without incurring banking fees.

Within and across instances of the cash-management system, bricks are standardized and secure such that they can function as reliable collateral for transactions. A brick can be removed from one instance of the system by scanning its SSPID out of that instance, and then scanned into another instance of the system by scanning the SSPID into that instance. The two instances communicate from their respective inventories the records of bundles, items, and item data, and other records associated with the brick, such that the records indicate that said bundles and items are present in the second instances and not present in the first instance. In some embodiments, this transfer of information is recorded and verified by blockchain, encryption, and/or the like. The standardized nature of the bricks enables the user to transfer bricks as described in Stage 4 to facilitate transactions.

Stage 4—Transactions with Bricks as Collateral

Once an individual has accumulated bricks and stored them in a secure location, they can then use the bricks as collateral for transactions. This can be accomplished by transmitting the SSPID and brick key to another party, thereby transferring title to the underlying cash. In addition to the transfer of the SSPID, the records of the bundles, items, and item data contained within the brick is transferred to the transferee's system inventory. The transfer of records of the contents of each brick allow for certainty of the brick's contents between parties. Further, because the brick can be equipped with physical, electronic, and other security features, parties can view bricks as secure collateral for a transaction. Transfers of the SSPID and brick key do not require the transfer of the physical cash, which becomes necessary only when the transferee wishes to extract physical cash. Because the SSPID and brick key can both be electronic records, the transfer is as simple as any other form of electronic fund transfer or transaction. The transferee can continue to hold title to the brick for use as collateral in future transactions.

The transfer of the SSPID and key avoids several problems traditionally associated with large cash transactions. First, it makes physical moving of the cash unnecessary, because cash need not be moved or removed from the bricks until the receiving party wishes to actually use the items contained in the brick. This eliminates risks of cash being lost during the physical relocation process by theft or error. In essence, the bricks function as a vault, and only the right to access the vault is transferred. Further, because each brick is associated with an inventory of cash value and item identity, there is no need to count large amounts of physical cash. In some embodiments, in which the system is configured to verify the authenticity of each item as it enters the system, the transferee is further assured that the items in the brick are not counterfeits.

Once the SSPID and brick key are transferred, the transferee is the owner of the brick. The transferee can then use the key as needed to open the brick and retrieve the physical cash. As noted above, this destroys the integrity of the brick in the data manager. Thus, while redemption of the physical cash is capable of being done at any time, excess physical cash must be returned to the cash management system and optionally placed into new bundles or bricks. The transferee is then free to take the needed cash and recreate bundles or bricks out of the remaining cash. The data manager can be configured to track the location and identity of all bricks and can track ownership of each brick as well. In some embodiments, a centralized record of title and transactions across all instances of the system is maintained and provides confidence in transfers. Thus, businesses locked out of the traditional banking system to quickly and easily transfer large amounts of money.

Further Embodiments

In an example involving a store employee and a customer, the store employee can advise a customer on a selection. The customer can select the product desired, scan the barcode of said product through the user interface, and the user interface displays the final transaction price on a screen. The customer then inserts cash into the intake portal, and once an amount equal to or greater than the transaction price is inserted, the user interface asks if this is really the final sale.

In some embodiments, the system allows for the job of the store employee to advise a customer on product(s) and/or packaging up the product(s) without handling cash. In some embodiments, the system includes integrated methods to manage product inventory, track consumer purchase behavior, correlate inventory and pricing, or other retail functions. In other embodiments, the system is designed to interface with third-party retail software capable of carrying out common retail operations. In further embodiments, the system is capable of fulfilling reporting and compliance requirements for the business. For example, the system can be capable of meeting tracking and reporting requirements imposed by the government on the cannabis industry. In some embodiments, the system is capable of creating and printing RFID tags to be attached to products. In further embodiments, the system is capable of interfacing with compliance software.

In some embodiments, the system can handle spontaneous cash needs. For example, vendors can come in without notice. The business at that point needs enough cash to complete the purchase from the vendor on the spot. In some embodiments, the system is capable of removing cash from a secondary local repository, unbundling the cash, and recording the cash value and identity of items removed from the system by the transaction. In further embodiments, the system can accept a vendor form enabling it to record and process routine or one-time transactions.

In some embodiments, the system possesses additional sorting functions, such as designating particular items of currency for changemaking, designating a particular set of items, or one or more bundles, for bank deposit or brick formation, and others. These sorting functions can further be enabled by a system containing multiple local or remote cash repositories.

In some embodiments, the system comprises a standalone countertop unit. In some embodiments, the countertop unit is directly connected to a safe below it. In further embodiments, cash is bundled and dropped from the countertop unit into the safe when a certain number of a denomination of currency is reached. For example, when 100 $20 bills are in the countertop unit, 50 are bundled and dropped into the safe. In other embodiments, cash is bundled and dropped at predetermined times, such as close of business or shift changes.

In some embodiments, the bundles or bricks are packaged in any available material, e.g., anything from shrink wrap to concrete. In some embodiments, additional security features are provided for bundles or bricks, such as two factor authentication, encryption, physical barriers, electronic barriers, and others.

In some embodiments, the cash-management system and data manager are capable of carrying out additional software functions, such as: point of sale programs, inventory management, pricing, government compliance, corporate compliance, RFID product tracking, vendor and source tracking, consumer identity, product sales volume analysis, tax calculation and remittance, real time cash on hand balancing, transaction reporting, and integration functionality with third-party software.

In some embodiments, the system is designed to possess additional technical support features, such as:

Limited need for manual backup

Supervised vending

Multiple drawers with distinct data sets, where drawers can be swapped on demand Rendering a malfunctioning drawer inaccessible until full functionality is returned Inaccessible repositories for additional security
Consumer and employee/user identification
Regulatory compliance features
Interoperability with all similar systems world-wide
Inter-merchant information sharing In some embodiments, the system comprises further additional features for a desired industry. In some embodiments, the system is connected to a casino chip dispenser to facilitate the trade of cash for chips. In some embodiments, the system is employed to create customized brick amounts for banks as an alternative means of electronic fund transfer. In some embodiments, the system is utilized by businesses to purchase product and retain payment in a secure manner. In some embodiments, the system is employed in tipping industries (such as fast food, dining, or strip clubs) to sort cash into individual employee accounts to eliminate the need to count and split tips. In some embodiments, the system is employed to accept cash in exchange for a QR code or other digital identifier which the user carries in place of a ticket for events.

In some embodiments, the system can incorporate quasi-monetary items, for example casino chips. In some embodiments, the system can incorporate fungible items of currency, wherein each item does not have a unique identifier. In some further embodiments, fungible currency is stored in a separate repository. In some further embodiments, information on fungible items within the system is recorded in the data manager, for example, a record of the type of fungible item, the value of each and all fungible items, and the count of each type of and the total fungible items within the system. In some embodiments, the fungible and non-fungible items are stored in the same repositories. An example of a fungible item of cash is a coin from most countries that issue coins. Lacking any unique identifiers, coins cannot be treated as unique items of inventory. However, bundles of coins can be labeled, given a DSPID, and subsequently tracked. In some embodiments, the system can incorporate cryptocurrency, either in digital or electronic format or through the use of physical items corresponding to set amounts of cryptocurrency and/or specific cryptocurrency wallets.

EXAMPLES

Example 1

This example follows the daily activity in a cannabis dispensary which utilizes the cash management system of the present invention.

At the beginning of the business day, the system inventory contains the following data:

TABLE 1

| ITEMS IN PRIMARY REPOSITORY | | | | | |
|---|---|---|---|---|---|
| Item Type | Item Value | Item Identifiers | | | |
| United States Bill | $1 | E1234567K | E1234568K | E1234569K | E1234570K |
| | | E1234571K | E1234572K | E1234574K | E1234575K |
| | | E1234576K | | | |
| United States Bill | $5 | E1234577K | E1234578K | | |
| United States Bill | $10 | E1234579K | E1234580K | E1234581K | |
| United States Bill | $20 | E1234582K | E1234583K | E1234584K | E1234585K |
| | | E1234586K | | | |
| United States Bill | $50 | E1234587K | E1234588K | | |
| United States Bill | $100 | E1234589K | E1234590K | E1234591K | E1234592K |
| | | E1234593K | E1234594K | E1234595K | E1234596K |
| | | E1234597K | | | |

TABLE 2

| FUNGIBLE CURRENCY | | |
|---|---|---|
| Item Type | Item Value | Item Count |
| United States Quarter | $0.25 | 12 |
| United States Dime | $0.10 | 22 |
| United States Nickel | $0.05 | 8 |
| United States Penny | $0.01 | 64 |
| Total on Hand | $6.24 | 106 |

TABLE 3

| BUNDLES | | | | | | |
|---|---|---|---|---|---|---|
| | | | | Bundle Contents | | |
| DSPID | Value | Item Type | Item Value | Item Identifiers | | |
| AA123 | $100 | United States Bill | $20 | E9876543M | E9876542M | E9876541M |
| | | | | E9876539M | E9876538M | |
| AB567 | $20 | United States Bill | $1 | E4563219K | E4563218K | E4563217K |
| | | | | E4563216K | E4563215K | E4563214K |
| | | | | E4563213K | E4563212K | E4563211K |
| | | | | E4563210K | E4563209K | E4563208K |
| | | | | E4563207K | E4563206K | E4563205K |
| | | | | E4563204K | E4563203K | E4563202K |
| | | | | E4563201K | E4563200K | |

TABLE 4

BRICKS

| | | | | Brick Contents | | | |
|---|---|---|---|---|---|---|---|
| | | | | | Bundle Contents | | |
| SSPID | Value | DSPID | Value | Item Type | Item Value | Item Identifiers | |
| B987Z | $500 | XY234 | $100 | United States Bill | $20 | C2468135M C2468137M C2468139M | C2468136M C2468138M |
| | | AK470 | $100 | United States Bill | $20 | C2468140M C2468142M C2468144M | C2468141M C2468143M |
| | | DU093 | $100 | United States Bill | $20 | C2468145M C2468147M C2468149M | C2468146M C2468148M |
| | | GJ213 | $100 | United States Bill | $20 | C2468150M C2468152M C2468154M | C2468151M C2468153M |
| | | TR346 | $100 | United States Bill | $20 | C2468155M C2468157M C2468159M | C2468156M C2468158M |

*Note
this example of a brick having a total value of $500 is provided for convenience. In most embodiments a brick is intended to aggregate large amounts of money - amounts that would be worth securing in the physical structure of the brick and that may be inconvenient to count.

TABLE 5

TRANSACTION HISTORY

Transaction 141
. . .
Transaction 142

A customer enters the dispensary. The customer consults with a budtender who is employed by the dispensary. The budtender recommends several products, and the customer decides to purchase some of those products. The budtender enters the products and quantities into the user interface, which comprises a touchscreen displaying a menu of products, sitting on top of a counter. The touchscreen then displays a list of the products to be purchased, the price of each, and the total transaction price. The budtender then proceeds to package the products while the customer approaches the touchscreen. The customer see that the total price is $96.39. The customer produces a $100 bill and inserts it into a slot located below the touchscreen. The customer's $100 bill is passed from the slot through a scanner. The scanner identifies that the item is a United States $100 bill, with a serial number D2345678L. The scanner verifies features of a legitimate $100 bill designed to be difficult to counterfeit and certifies the bill as being genuine. The system further verifies the serial number against a database of known items, to confirm, for example, that this bill is not known to be located anywhere else, and/or is not on a list of known stolen bills, and by these cross-checks the bill entering the system is further assured to be legitimate. The scanned information is passed to the system inventory, which creates a new record for the bill in the ITEMS IN PRIMARY REPOSITORY inventory. The bill is then passed into a primary repository located within the counter. In some embodiments of the cash management system, multiple users of the system share certain data in their inventories to permit more robust verification of such things as duplicate serial numbers, customers proffering counterfeit bills, and the like.

The cash management system recognizes that cash has been inserted which is greater than the transaction price. The touchscreen displays a prompt to the customer which reads "Inserted Value: $100. Is this sale final?" and buttons labeled "Yes" and "No". The customer presses the "Yes" button, verifying the amount inserted and that the sale is to be completed. The cash management system receives the instruction to complete the sale. At that time, the system calculates the amount of change due to the customer to be $3.61. Three $1 bills are retrieved from the primary repository and provided to a scanner. The scanner verifies and records that each bill is a United States $1 bill. The scanner also records each bill's serial number. The serial numbers of the three bills to be dispensed are E1234567K, E1234568K, and E1234569K. This information is transmitted from the scanner to the system inventory. The three $1 bills are provided to the customer through the same slot which the customer had earlier inserted the $100 bill. At the same time, two quarters, one dime, and one penny are dispensed from the fungible currency storage into a change dish located adjacent to the bill slot below the touchscreen. The customer takes the dispensed bills and coins, receives the product from the budtender, and departs the store.

As the change is dispensed, the system inventory updates the records of ITEMS IN PRIMARY REPOSITORY and FUNGIBLE CURRENCY in accordance with information received from the scanner and data manager. After the completion of the transaction, the system inventory contains the following updated data in the ITEMS IN PRIMARY REPOSITORY and FUNGIBLE CURRENCY records:

TABLE 6

ITEMS IN PRIMARY REPOSITORY

| Item Type | Item Value | Item Identifiers | | |
|---|---|---|---|---|
| United States Bill | $1 | E1234570K E1234572K E1234576K | E1234571K E1234574K | E1234575K |
| United States Bill | $5 | E1234577K | E1234578K | |
| United States Bill | $10 | E1234579K | E1234580K | E1234581K |
| United States Bill | $20 | E1234582K E1234585K | E1234583K E1234586K | E1234584K |

TABLE 6-continued

ITEMS IN PRIMARY REPOSITORY

| Item Type | Item Value | Item Identifiers | | |
|---|---|---|---|---|
| United States Bill | $50 | E1234587K | E1234588K | |
| United States Bill | $100 | E1234589K | E1234590K | E1234591K |
| | | E1234592K | E1234593K | E1234594K |
| | | E1234595K | E1234596K | E1234597K |
| | | D2345678L | | |

TABLE 7

FUNGIBLE CURRENCY

| Item Type | Item Value | Item Count |
|---|---|---|
| United States Quarter | $0.25 | 10 |
| United States Dime | $0.10 | 21 |
| United States Nickel | $0.05 | 8 |
| United States Penny | $0.01 | 63 |
| Total on Hand | $5.63 | 102 |

The BUNDLES and BRICKS records remain unchanged, because no bundles or bricks were involved in the transaction.

Following the transaction, the system recognizes that there are ten $100 bills in the primary repository. The system has previously been programmed to create a bundle of ten $100 bills when such items are present in the primary repository, as they are not needed for customer transactions. The system sends the command to create a bundle. Within the primary repository, a device retrieves a $100 bill and passes it to a scanner. The scanner verifies and records that the bill is a US $100 bill. The scanner further records the serial number of the bill. Following scanning, the bill is provided to a cash bundling system integrated in the counter below the primary repository. This process is repeated until ten $100 bills have been provided to the cash bundling system. The cash bundling system then bundles the bills and attaches a physical DSPID to the bundle by stamping a barcode on the paper that wraps the bills. The bundle is dropped out of the cash bundling system into a secondary repository located directly below the counter containing the primary repository.

Simultaneously with the command to create a bundle, the system inventory creates a new bundle. This new bundle is assigned the DSPID YZ579. As each bill to be included in the bundle is scanned, the serial number of the bill is entered into the record of items within the bundle. The items are removed from the records of cash in the primary repository. After the bundling process is completed, the system inventory contains the following data:

TABLE 8

ITEMS IN PRIMARY REPOSITORY

| Item Type | Item Value | Item Identifiers | | |
|---|---|---|---|---|
| United States Bill | $1 | E1234570K | E1234571K | E1234572K |
| | | E1234574K | E1234575K | E1234576K |
| United States Bill | $5 | E1234577K | E1234578K | |
| United States Bill | $10 | E1234579K | E1234580K | E1234581K |
| United States Bill | $20 | E1234582K | E1234583K | E1234584K |
| | | E1234585K | E1234586K | |
| United States Bill | $50 | E1234587K | E1234588K | |

TABLE 9

BUNDLES

| DSPID | Value | Item Type | Item Value | Item Identifiers | | |
|---|---|---|---|---|---|---|
| AA123 | $100 | United States Bill | $20 | E9876543M | E9876542M | E9876541M |
| | | | | E9876539M | E9876538M | |
| AB567 | $20 | United States Bill | $1 | E4563219K | E4563218K | E4563217K |
| | | | | E4563216K | E4563215K | E4563214K |
| | | | | E4563213K | E4563212K | E4563211K |
| | | | | E4563210K | E4563209K | E4563208K |
| | | | | E4563207K | E4563206K | E4563205K |
| | | | | E4563204K | E4563203K | E4563202K |
| | | | | E4563201K | E4563200K | |
| YZ579 | $1000 | United States Bill | $100 | E1234589K | E1234590K | E1234591K |
| | | | | E1234592K | E1234593K | E1234594K |
| | | | | E1234595K | E1234596K | E1234597K |
| | | | | D2345678L | | |

The FUNGIBLE CURRENCY and BRICKS records remain unchanged, because no fungible currency or bricks were involved in the action.

Sometime following the transaction and bundling, the dispensary manager is reviewing the system inventory records from a computer in the manager's officer. The manager notices that there are only six $1 bills in the primary repository available for making change. The manager decides this level is insufficient. The manager tells the system to unpackage bundle AB567 and have the bills within made available in the primary repository. Within the secondary repository, a device locates bundle AB567 by its DSPID, which consists of a QR code stamped on the paper which wraps the bills together. Once the device locates the bundle, it is provided back to the cash bundling system. The cash bundling system unbundles AB567 and passes the now-free bills to the primary repository. At the same time, the system inventory adds the records of bills contained in AB567 to the ITEMS IN PRIMARY REPOSITORY inventory. The system inventory then removes bundle AB567 from the BUNDLES records.

Following the unbundling, the system inventory contains the following updated data:

TABLE 10

ITEMS IN PRIMARY REPOSITORY

| Item Type | Item Value | Item Identifiers | | |
|---|---|---|---|---|
| United States Bill | $1 | E1234570K | E1234571K | E1234572K |
| | | E1234574K | E1234575K | E1234576K |
| | | E4563219K | E4563218K | E4563217K |
| | | E4563216K | E4563215K | E4563214K |
| | | E4563213K | E4563212K | E4563211K |
| | | E4563210K | E4563209K | E4563208K |
| | | E4563207K | E4563206K | E4563205K |
| | | E4563204K | E4563203K | E4563202K |
| | | E4563201K | E4563200K | |
| United States Bill | $5 | E1234577K | E1234578K | |
| United States Bill | $10 | E1234579K | E1234580K | E1234581K |
| United States Bill | $20 | E1234582K | E1234583K | E1234584K |
| | | E1234585K | E1234586K | |
| United States Bill | $50 | E1234587K | E1234588K | |

TABLE 11

BUNDLES

| | | | Bundle Contents | | | |
|---|---|---|---|---|---|---|
| DSPID | Value | Item Type | Item Value | | Item Identifiers | |
| AA123 | $100 | United States Bill | $20 | E9876543M E9876539M | E9876542M E9876538M | E9876541M |
| YZ579 | $1000 | United States Bill | $100 | E1234589K E1234592K E1234595K D2345678L | E1234590K E1234593K E1234596K | E1234591K E1234594K E1234597K |

The FUNGIBLE CURRENCY and BRICKS records remain unchanged, because no fungible currency or bricks were involved in the transaction.

Sometime after the unbundling, a vendor arrives at the dispensary. The vendor meets with the dispensary manager and provides the manager an invoice for product delivered. The invoice is for $1500. The manager decides to fulfil the invoice by transferring to the vendor $1000 in the form of bundle YZ579 and $500 in the form of brick B987Z. The manager enters into the system that bundle YZ579 is to be removed from the system for a vendor payment. The manager enters a withdrawal authorization code and confirms the withdrawal. The manager goes to the secondary repository, which is opened as a result of the authorization code. The manager finds bundle YZ579, identified by the DSPID number printed on the cash wrapping, and removes it from the secondary repository. The manager closes the secondary repository after removing bundle YZ579. The manager hands bundle YZ579 to the vendor. At the same time, the system inventory removes the records of bundle YZ579 and the bills that were contained in it from the BUNDLES inventory. The system inventory creates a new record in a TRANSACTION HISTORY inventory for the vendor payment. The system inventory records that bundle YZ579 and the bills within have been given to the vendor. In an alternative embodiment, the manager simply enters a "withdrawal needed" of $1500 and the system selects the relevant bundles having a total value of $1500. The bundles are delivered through a bundle output port and the serial numbers of all items in the delivered bundles are removed from the inventory.

After providing bundle YZ579 to the vendor, the manager returns to his computer. The invoice provides a digital address corresponding to the vendor's instance of the cash management system. The manager enters this address in the user interface and indicates that payment is to be made to the address. The manager inputs that brick B987Z is to be transferred to the vendor. The manager authorizes and confirms this transaction. The dispensary's system inventory transfers to the vendor's system inventory the SSPID and digital key corresponding to B987Z, as well as the records of bundles and bills contained within B987Z. The dispensary's system inventory removes the record of B987Z and the bundles and bills contained within from the BRICKS inventory. The vendor's system inventory adds the record of B987Z and the bundles and bills within to its BRICKS inventory. The dispensary's system inventory updates the record of the transaction in the TRANSACTION HISTORY inventory to reflect that brick B987Z and the bundles and bills contained within was transferred as part of the transaction with the vendor. The vendor's system inventory creates a new record in its TRANSACTION HISTORY indicating receipt of the bundle and brick as payment for the invoice.

In accordance with the dispensary's practice, brick B987Z and other bricks created by dispensary are stored in a warehouse operated by a third party. The third party operates the warehouse specifically as a secure storage location for bricks. The dispensary's system inventory transmits to the vendor's system inventory the fact that brick B987Z is physically located in said warehouse. The vendor also uses this third-party warehouse, in addition to its own local brick storage locations. Because the vendor does not immediately require the cash within brick B987Z, the vendor can allow it to remain in the warehouse for collateral in a future transaction. Upon confirmation that brick B987Z's information has been transferred to vendor's system inventory, the vendor completes delivery of the product and leaves the dispensary.

Following the vendor transaction, the dispensary's system inventory contains the following data:

TABLE 12

ITEMS IN PRIMARY REPOSITORY

| Item Type | Item Value | Item Identifiers | | |
|---|---|---|---|---|
| United States Bill | $1 | E1234570K | E1234571K | E1234572K |
| | | E1234574K | E1234575K | E1234576K |
| | | E4563219K | E4563218K | E4563217K |
| | | E4563216K | E4563215K | E4563214K |
| | | E4563213K | E4563212K | E4563211K |
| | | E4563210K | E4563209K | E4563208K |
| | | E4563207K | E4563206K | E4563205K |
| | | E4563204K | E4563203K | E4563202K |
| | | E4563201K | E4563200K | |
| United States Bill | $5 | E1234577K | E1234578K | |
| United States Bill | $10 | E1234579K | E1234580K | E1234581K |
| United States Bill | $20 | E1234582K | E1234583K | E1234584K |
| | | E1234585K | E1234586K | |
| United States Bill | $50 | E1234587K | E1234588K | |

TABLE 13

FUNGIBLE CURRENCY

| Item Type | Item Value | Item Count |
|---|---|---|
| United States Quarter | $0.25 | 10 |
| United States Dime | $0.10 | 21 |
| United States Nickel | $0.05 | 8 |
| United States Penny | $0.01 | 63 |
| Total on Hand | $5.63 | 102 |

TABLE 14

BUNDLES

| DSPID | Value | Item Value | Item Value | Item Identifiers | | |
|---|---|---|---|---|---|---|
| AA123 | $100 | United States Bill | $20 | E9876543M | E9876542M | E9876541M |
| | | | | E9876539M | E9876538M | |

*Bundle Contents spans Item Value, Item Value, Item Identifiers columns*

TABLE 15

BRICKS

| SSPID | Value | DSPID | Value | Item Type | Item Value | Item Identifiers |
|---|---|---|---|---|---|---|

*Brick Contents / Bundle Contents headers*

The BRICKS inventory is empty.

TABLE 16

TRANSACTION HISTORY

Transaction 141

...

Transaction 142

...

Transaction 143

Type: Invoice Payment

To: Vendor

Date: Jul. 25, 2019

Items Transferred:

Bundle Contents

| DSPID | Value | Item Type | Item Value | Item Identifiers | | |
|---|---|---|---|---|---|---|
| YZ579 | $1000 | United States Bill | $100 | E1234589K | E1234590K | E1234591K |
| | | | | E1234592K | E1234593K | E1234594K |
| | | | | E1234595K | E1234596K | E1234597K |
| | | | | D2345678L | | |

Brick Contents / Bundle Contents

| SSPID | Value | DSPID | Value | Item Type | Item Value | Item Identifiers | |
|---|---|---|---|---|---|---|---|
| B987Z | $500 | XY234 | $100 | United States Bill | $20 | C2468135M C2468137M C2468139M | C2468136M C2468138M |
| | | AK470 | $100 | United States Bill | $20 | C2468140M C2468142M C2468144M | C2468141M C2468143M |
| | | DU093 | $100 | United States Bill | $20 | C2468145M C2468147M C2468149M | C2468146M C2468148M |
| | | GJ213 | $100 | United States Bill | $20 | C2468150M C2468152M C2468154M | C2468151M C2468153M |
| | | TR346 | $100 | United States Bill | $20 | C2468155M C2468157M C2468159M | C2468156M C2468158M |

Following the transaction, the following records are added to the vendor's system inventory:

TABLE 17

BUNDLES

Bundle Contents

| DSPID | Value | Item Type | Item Value | Item Identifiers | | |
|---|---|---|---|---|---|---|
| YZ579 | $1000 | United States Bill | $100 | E1234589K | E1234590K | E1234591K |
| | | | | E1234592K | E1234593K | E1234594K |
| | | | | E1234595K | E1234596K | E1234597K |
| | | | | D2345678L | | |

TABLE 18

BRICKS

Brick Contents

Bundle Contents

| SSPID | Value | DSPID | Value | Item Type | Item Value | Item Identifiers | |
|---|---|---|---|---|---|---|---|
| B987Z | $500 | XY234 | $100 | United States Bill | $20 | C2468135M | C2468136M |
| | | | | | | C2468137M | C2468138M |
| | | | | | | C2468139M | |
| | | AK470 | $100 | United States Bill | $20 | C2468140M | C2468141M |
| | | | | | | C2468142M | C2468143M |
| | | | | | | C2468144M | |
| | | DU093 | $100 | United States Bill | $20 | C2468145M | C2468146M |
| | | | | | | C2468147M | C2468148M |
| | | | | | | C2468149M | |
| | | GJ213 | $100 | United States Bill | $20 | C2468150M | C2468151M |
| | | | | | | C2468152M | C2468153M |
| | | | | | | C2468154M | |
| | | TR346 | $100 | United States Bill | $20 | C2468155M | C2468156M |
| | | | | | | C2468157M | C2468158M |
| | | | | | | C2468159M | |

The vendor's system inventory now reflects that it possesses title to the cash in the bundle and brick, even though vendor only possesses the physical cash in the bundle. The general principles embodied in this example can be repeated, altered, or expanded to carry out transactions and transfers of funds between a plurality of businesses. Each business can install and integrate an instance of the system, which is capable of communicating with other instances belonging to other businesses. In the above example, the system inventories of the dispensary and vendor can also be linked to an instance possessed by the third-party warehouse operator, who retains an additional record of the transaction and the bricks, bundles, and bills involved, thereby increasing validity, transparency, and security. In the example above, any of the parties to the transaction can record the transaction and identities of the bricks, bundles, and bills involved in a blockchain ledger for security and verification purposes.

Example 2

The following example demonstrates the use of the present invention in a casino setting. Primary Repository A is a chip exchanger located on the casino floor, which is connected to other chip exchangers within the casino through a central chip vault. The chips in the casino have RFID chips embedded within them which identify the chip and the casino to which it belongs.

At 7:00 pm, the Royale Casino's system inventory contains the following data:

TABLE 19

ITEMS IN PRIMARY REPOSITORY A

| Item Type | Item Value | Item Identifier | | |
|---|---|---|---|---|
| United States Bill | $10 | U3217890P | U3217891P | U3217892P |
| United States Bill | $20 | U3217893P | U3217894P | U3217895P |
| | | U3217896P | U3217897P | |
| United States Bill | $50 | U3217898P | U3217899P | |
| United States Bill | $100 | U3217900P | U3217901P | U3217902P |
| | | U3217903P | U3217904P | |
| Royale Chip | $5 | RCT334 | RCT335 | RCT336 |
| Royale Chip | $10 | RCT337 | RCT338 | |
| Royale Chip | $25 | RCT339 | RCT340 | RCT341 |
| | | RCT342 | RCT343 | RCT344 |
| Royale Chip | $50 | RCT345 | RCT346 | |
| Royale Chip | $100 | RCT347 | RCT348 | RCT349 |
| Royale Chip | $250 | RCT350 | RCT351 | |
| Royale Chip | $500 | RCT352 | RCT353 | |

TABLE 20

BUNDLES

| DSPID | Value | Item Type | Item Value | Item Identifier | | |
|---|---|---|---|---|---|---|
| DD345 | $1000 | United States Bill | $100 | Y4928475C Y4928478C Y4928481C Y4928484C | Y4928476C Y4928479C Y4928483C | Y4928477C Y4928480C Y4928483C |
| DE837 | $2500 | United States Bill | $100 | Y4928485C Y4928488C Y4928491C Y4928494C Y4928497C Y4928500C Y4928503C Y4928506C Y4928509C | Y4928486C Y4928489C Y4928492C Y4928495C Y4928498C Y4928501C Y4928504C Y4928507C | Y4928487C Y4928490C Y4928493C Y4928496C Y4928499C Y4928502C Y4928505C Y4928508C |
| FE264 | $2500 | United States Bill | $100 | Y4928510C Y4928513C Y4928516C Y4928519C Y4928522C Y4928525C Y4928528C Y4928531C Y4928534C | Y4928511C Y4928514C Y4928517C Y4928520C Y4928523C Y4928526C Y4928529C Y4928532C | Y4928512C Y4928515C Y4928518C Y4928521C Y4928524C Y4928527C Y4928530C Y4928533C |
| RG746 | $5000 | Royale Chip | $500 | RCX984 RCX987 RCX990 RCX993 | RCX985 RCX988 RCX991 | RCX986 RCX989 RCX992 |

TABLE 21

BRICKS

| SSPID | Value | DSPID | Value | Brick Contents — Bundle Contents | | | |
|---|---|---|---|---|---|---|---|
| | | | | Item Type | Item Value | Item Identifier | |
| B800Z | $500 | XY234 | $100 | United States Bill | $20 | T2468543R T2468545R T2468547R | T2468544R T2468546R |
| | | AK470 | $100 | United States Bill | $20 | T2468548R T2468550R T2468552R | T2468549R T2468551R |
| | | DU093 | $100 | United States Bill | $20 | T2468553R T2468555R T2468557R | T2468554R T2468556R |
| | | GJ213 | $100 | United States Bill | $20 | T2468558R T2468560R T2468562R | T2468559R T2468561R |
| | | TR346 | $100 | United States Bill | $20 | T2468563R T2468565R T2468567R | T2468564R T2468566R |

TABLE 22

TRANSACTION HISTORY

Transaction 6892
. . .
Transaction 6893
. . .

A casino patron approaches the chip exchanger, looking to cash out their winnings. The chip exchanger has a slot located on the exterior capable of accepting casino chips. The customer inserts their chips: two $25 Royale chips, three $10 Royale chips, and a $50 chip belonging to the nearby Star casino. The chip exchanger has a small screen which displays the value of the chips inserted. Each chip is passed from the slot to an RFID scanner, which scans the value and identifier of the Royale chips (RCL245, RCL246, and RCL247 for the $10 chips, and RCS756 and RCS788 for the $25 chips). The Royale chips are then deposited in the chip exchanger's chip reserves. The Star chip does not contain an RFID. When the RFID scanner fails to recognize a signature from the Star chip, the Star chip is diverted to a separate optical scanner. The optical scanner recognizes that the chip is issued by Star. Because Royale does not recognize or exchange Star chips, the Star chip is provided back to the patron through the chip slot. The screen displays an error message indicating to the patron that this chip is not accepted at the Royale Casino.

As each chip is scanned, the system inventory is updated to indicate that the chip is now contained within the primary repository of the chip exchanger. The system adds the total value of the inserted Royale chips to determine how much value must be dispensed to the patron. After calculating that the patron is owed $80, the system retrieves from the primary repository one $50 bill, one $20 bill, and one $10 bill. Each bill is provided to the optical scanner, which verifies the value of each bill and records the serial numbers of each bill (in this case U3217898P for the $50 bill, U3217893P for the $20 bill, and U3217891P for the $10 bill). The three bills are dispensed through a separate bill slot on the exterior of the chip exchanger. The patron takes the bills and the returned Star chip and leaves. The system inventory is updated to reflect the removal of the three bills that were dispensed.

Following the patron's cashing out, the system inventory contains the following updated data:

TABLE 23

ITEMS IN PRIMARY REPOSITORY A

| Item Type | Item Value | Item Identifier | | |
|---|---|---|---|---|
| United States Bill | $10 | U3217890P | | U3217892P |
| United States Bill | $20 | | U3217894P | U3217895P |
| | | U3217896P | U3217897P | |
| United States Bill | $50 | | U3217899P | |

TABLE 23-continued

ITEMS IN PRIMARY REPOSITORY A

| Item Type | Item Value | Item Identifier | | |
|---|---|---|---|---|
| United States Bill | $100 | U3217900P<br>U3217903P | U3217901P<br>U3217904P | U3217902P |
| Royale Chip | $5 | RCT334 | RCT335 | RCT336 |
| Royale Chip | $10 | RCT337<br>RCL245 | RCT338<br>RCL246 | RCL247 |
| Royale Chip | $25 | RCT339<br>RCT342<br>RCS756 | RCT340<br>RCT343<br>RCS788 | RCT341<br>RCT344 |
| Royale Chip | $50 | RCT345 | RCT346 | |
| Royale Chip | $100 | RCT347 | RCT348 | RCT349 |
| Royale Chip | $250 | RCT350 | RCT351 | |
| Royale Chip | $500 | RCT352 | RCT353 | |

TABLE 24

TRANSACTION HISTORY
Transaction 6892
. . .
Transaction 6893
. . .
Transaction 6894
Type: Cashout
Date: Aug. 6, 2019
Time: 7:03 pm
Received:

| Item Type | Item Value | Item Identifiers | | |
|---|---|---|---|---|
| Royale Chip | $10 | RCL245 | RCL246 | RCL247 |
| Royale Chip | $25 | RCS756 | RCS788 | |

Dispensed:

| | | | |
|---|---|---|---|
| United States Bill | $10 | U3217891P | |
| United States Bill | $20 | U3217893P | |
| United States Bill | $50 | U3217898P | |

The BUNDLES and BRICKS records are not changed because no bundles or bricks were involved in the transaction.

The system issues a command to form a $5,000 brick using bundles FE264 and DE837. Within the casino's secondary repository, a device locates both bundles by scanning the DSPID printed on the side of the money wrapping. The bundles are retrieved by the device and placed into a high-strength composite material box, which is to serve as the brick. The box further contains an embedded circuit board and transmitter. The exterior of the box contains a 0-9 numeric keypad. The box is capable of locking securely and is only able to be unlocked by entering the proper code on the keypad. At the same time, the data manager assigns the new brick the identity C028P, and assigns a key, which is 8675309. The new brick's SSPID and key are transmitted to the circuit in the brick box. The box is then closed and locked. At this point, it can only be opened by entering 8675309 on the keypad. The system inventory then creates a new brick with identity C028P in the BRICKS inventory, and associates with the brick record the data on the bundles and items contained within it. The system inventory then removes DE837 and FE264 from the BUNDLES inventory. The physical brick is moved to a secure location in the casino's vault.

Following the formation of the new brick, the system inventory contains the following updated information:

TABLE 25

BUNDLES

| | | Bundle Contents | | | | |
|---|---|---|---|---|---|---|
| DSPID | Value | Item Type | Item Value | Item Identifier | | |
| DD345 | $1000 | United States Bill | $100 | Y4928475C<br>Y4928478C<br>Y4928481C<br>Y4928484C | Y4928476C<br>Y4928479C<br>Y4928482C | Y4928477C<br>Y4928480C<br>Y4928483C |
| RG746 | $5000 | Royale Chip | $500 | RCX984<br>RCX987<br>RCX990<br>RCX993 | RCX985<br>RCX988<br>RCX991 | RCX986<br>RCX989<br>RCX992 |

TABLE 26

BRICKS

| | | | | Brick Contents | | | |
|---|---|---|---|---|---|---|---|
| | | | | Bundle Contents | | | |
| SSPID | Value | DSPID | Value | Item Type | Item Value | Item Identifier | |
| B800Z | $500 | XY234 | $100 | United States Bill | $20 | T2468543R<br>T2468545R<br>T2468547R | T2468544R<br>T2468546R |
| | | AK470 | $100 | United States Bill | $20 | T2468548R<br>T2468550R<br>T2468552R | T2468549R<br>T2468551R |
| | | DU093 | $100 | United States Bill | $20 | T2468553R<br>T2468555R<br>T2468557R | T2468554R<br>T2468556R |
| | | GJ213 | $100 | United States Bill | $20 | T2468558R<br>T2468560R<br>T2468562R | T2468559R<br>T2468561R |
| | | TR346 | $100 | United States Bill | $20 | T2468563R<br>T2468565R<br>T2468567R | T2468564R<br>T2468566R |
| C028P | $5000 | DE837 | $2500 | United States Bill | $100 | Y4928485C<br>Y4928487C<br>Y4928489C<br>Y4928491C | Y4928486C<br>Y4928488C<br>Y4928490C<br>Y4928492C |

TABLE 26-continued

BRICKS

| | | | Brick Contents | | | | |
|---|---|---|---|---|---|---|---|
| | | | | Bundle Contents | | | |
| SSPID | Value | DSPID | Value | Item Type | Item Value | Item Identifier | |
| | | | | | | Y4928493C | Y4928494C |
| | | | | | | Y4928495C | Y4928496C |
| | | | | | | Y4928497C | Y4928498C |
| | | | | | | Y4928499C | Y4928500C |
| | | | | | | Y4928501C | Y4928502C |
| | | | | | | Y4928503C | Y4928504C |
| | | | | | | Y4928505C | Y4928506C |
| | | | | | | Y4928507C | Y4928508C |
| | | | | | | Y4928509C | |
| | | FE264 | $2500 | United States Bill | $100 | Y4928510C | Y4928511C |
| | | | | | | Y4928512C | Y4928513C |
| | | | | | | Y4928514C | Y4928515C |
| | | | | | | Y4928516C | Y4928517C |
| | | | | | | Y4928518C | Y4928519C |
| | | | | | | Y4928520C | Y4928521C |
| | | | | | | Y4928522C | Y4928523C |
| | | | | | | Y4928524C | Y4928525C |
| | | | | | | Y4928526C | Y4928527C |
| | | | | | | Y4928528C | Y4928529C |
| | | | | | | Y4928530C | Y4928531C |
| | | | | | | Y4928532C | Y4928533C |
| | | | | | | Y4928534C | |

The ITEMS OF CURRENCY IN PRIMARY REPOSITORY A records are not changed because those items were not involved in the transaction. The TRANSACTIONS inventory is not changed because the casino does not record internal movements of cash to that database.

Example 3

A convenience store implements the cash management system of the present invention. Records and inventory are maintained in a manner similar to those shown in Examples 1 and 2. Because the store has only limited space to retain cash, and for security reasons, the store has implemented procedures to deposit unneeded cash with its bank. The first step of this procedure is bundling cash periodically throughout the day. The store is open 24 hours a day, so it has decided to bundle cash in excess of a defined amount to always be retained in the register at 10:00 am and 8:00 pm. When these bundles are created, their DSPIDs and contents are transmitted to the store's bank. This transmission is encrypted and verified by blockchain technology. Thus, whenever a bundle is created, both the store and the bank are simultaneously made aware of the cash value and items of currency that the store possesses.

The store contracts with an armored car company to pick up the bundles every other day. At pickup time, the store manager enters a pickup code into the user interface. This permits the manager and armored car driver to retrieve the bundles from the secondary repository, which is a safe built into the floor under the register counter. Additionally, the store manager provides to the armored car driver an inventory printout that lists all bundles to be deposited, including the DSPIDs of said bundles. The armored car takes the bundles and the inventory printout to the store's bank.

At the bank, the inventory printout is verified against the list of bundles previously transmitted to the bank. If the bank already has data on the bundle, the bundle is scanned into the bank's system, noted to be in the bank's physical possession, and secured within the bank's physical vault. If the bank does not have data on the bundle, the bank sends a request to the store for data associated with each DSPID it does not recognize. Once the store provides information associated with the unknown bundle, the bank treats it as discussed above. Optionally, the bank may transmit confirmation to the store that each bundle has been received, recorded, and physically stored in the bank vault.

Example 4

The Royale Casino implements the cash management system of the present invention. Records and inventory are maintained in a manner similar to Examples 1 and 2. The casino retains large amounts of cash, in loose form as well as within bundles and bricks kept in the casino vault. The casino also finds that it needs to transfer cash to its bank to facilitate business needs. To accomplish this in a secure manner, the casino has decided to create bricks specifically designated for transfer to a bank. When a transfer is needed, the casino first identifies bundles and bricks that are to be sent to the bank for deposit. In this case, the casino selects ten bundles, each with value of $2,500, to deposit $25,000 in the bank. The casino also selects five bricks, two with value $50,000 and three with value $10,000, to deposit $130,000 in the bank.

The selected bundles are enclosed within a brick package, which is then assigned a the SSPID and given an access key by the system inventory. The selected bricks are similarly enclosed within a brick package, assigned an SSPID and access key. The system inventory alerts the bank of an incoming transfer and transmits the SSPIDs and access codes through an encrypted, blockchain verified communication. The bank acknowledges that the transfer is incoming. A courier for the casino securely and discretely physically transfers the two new bricks to the bank.

The SSPIDs of all new bricks are confirmed at the bank to verify that they are the correct bricks for the transfer. Once the bricks identity is confirmed, the bank uses the encrypted access/unlock keys to open each brick. This signals to the bank and casino's system inventory that the brick has been destroyed and is no longer valid as a system record. The bank takes the bundles from the first new brick, scans the DPSID for each bundle into its own system, and physically secures them in its vault. In some embodiments the data transmitted to the bank include the DSPID of every bundle in every brick. Thus when a brick is destroyed by opening, the data previously associated with the brick's single SSPID becomes data associated with DSPIDs of the various bundles that had been contained in the brick. The bank takes the bricks that were used to create the second new brick and scans them into its own system, then physically secures them in its vault for its own future use. The courier takes the two brick packages that previously contained the new bricks back to the casino so that they can be reused to create new transfer bricks for a future bank deposit.

The foregoing examples are provided for illustrative purposes and are not to be construed to represent the sole or entire embodiment of the invention. Within the data manager and system inventory, further records can be created or maintained, and the foregoing examples should not be construed to limit the types, sizes, formats, indexes, or other traits of the inventory, sub-inventory, or records.

The various methods and techniques described above provide a number of ways to carry out the application. Of course, it is to be understood that not necessarily all objectives or advantages described are achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by including one, another, or several other features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, any numbers expressing quantities of ingredients, properties such as molecular weight, reaction conditions, and so forth, used to describe and claim certain embodiments of the disclosure are to be understood as being modified in some instances by the term "about." Accordingly, in some embodiments, the numerical parameters set forth in the written description and any included claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are usually reported as precisely as practicable.

In some embodiments, the terms "a" and "an" and "the" and similar references used in the context of describing a particular embodiment of the application (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Variations on preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that can have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. A cash-management system for handling of multiple items of at least one currency type, the currency of each type having a plurality of predetermined value denominations, the currency of each type further comprising a unique identifier, wherein said unique identifier is unique to each item of currency within a currency type, such that each item of currency of a given type is distinguishable from every other item of said type; the system comprising a user-interface stage, the user-interface stage comprising an intake portal to receive currency inputs from a user, wherein the intake portal comprises a scanner to capture item data from an item of intake currency; wherein the item data comprises the item's unique identifier and the item's value denomination; the system further comprising a processor to receive, process, and transmit said item data to a system record, wherein the system record comprises a system inventory of all currency items present in the system; the system further comprising a sorter to sort each item of input currency into one of a plurality of primary currency stores, wherein each primary currency store corresponds to the value denomination, such that after handling by the sorter each item of input currency is placed in a selected primary currency store according to the value denomination of said item of input currency, further comprising a dynamic currency storage stage in physical communication with the user-interface stage, wherein the physical communication between the stages comprises a dynamic packaging interstage; wherein the dynamic packaging interstage is to selects a predetermined number of currency items of like value denomination from a primary currency store and package the predetermined number of items in a dynamic storage package (DSP), each DSP having an assigned dynamic storage package identifier (DSP Identifier) unique to said DSP, and each DSP having a predetermined total currency value based upon the predetermined number and the value denomination of the DSP, and wherein the dynamic interstage is to deposit each DSP, after packaging, into the dynamic currency storage stage; and wherein in connection with packaging and deposit of a DSP, the DSP Identifier is communicated to the system record, and wherein the DSP Identifier corresponds to a unique DSP sub-inventory of currency items within the system inventory, wherein the DSP sub-inventory is a subset of the system inventory.

2. The system of claim 1, wherein the dynamic packaging interstage is to retrieve a DSP and depackage said DSP and deliver currency from said depackaged DSP back to a primary currency store, or deliver the entire DSP to a user via a DSP-output in the user interface stage.

3. The system of claim 2, wherein the DSP identifier is recorded as exiting the system and all associated unique identifiers are removed from the system inventory.

4. The system of claim 1, wherein upon depackaging, the DSP identifier is removed from the system record and the unique identifiers are no longer associated with a DSP through a DSP identifier.

5. The system of claim 1, further comprising a payout ledger of DSPs or individual currency items outputted from the user interface stage.

6. The system of claim 1, wherein the dynamic currency storage stage further comprises a banking deposit function, wherein multiple DSPs are withdrawn directly from a portal in the dynamic currency storage stage in preparation for a bank deposit or other use of the currency within the DSPs.

7. The system of claim 6, wherein DSP Identifiers and sub-inventories are communicated to the bank and are recorded in the system record as having been withdrawn from the system inventory for bank deposit.

8. The system of claim 1, further comprising a static packaging interstage, wherein, said static packaging interstage is to receive multiple DSPs and package them into a secure container as a static storage package (SSP) for containing currency.

9. The system of claim 8, wherein the SSP is one or more of tamperproof, fireproof, waterproof, EMP-proof, and location-trackable.

10. The system of claim 8, wherein the SSP comprises a unique static storage package identifier (SSPID).

11. The system of claim 8, wherein the SSP contains a total amount of currency equaling a predetermined value.

12. The system of claim 8, wherein the SSP comprises an unlock code required for opening the SSP.

13. The system of claim 12, wherein the unlock code is executable from a remote location.

14. The system of claim 12, wherein the unlock code functions in an unlocking device to unlock the SSP.

15. The system of claim 14 wherein the unlock code functions to unlock the SSP only when it is in physical contact with the unlocking device.

16. The system of claim 8, further comprising a static storage stage for secure storage of multiple SSPs.

17. The system of claim 16, wherein the static storage is for input and output of SSPs via at least one portal.

18. The system of claim 17, wherein the at least one portal requires one or more of an access code and a physical key for activation.

19. The system of claim 16, wherein the static storage is to read and report all SSPIDs of SSPs contained therein.

20. The system of claim 16, comprising an sub-inventory of all items contained within the static storage.

21. The system of claim 8, wherein the static packaging interstage is integral with the dynamic currency storage stage or with the static storage stage.

22. The system of claim 8, further comprising a centralized currency storage stage (CCSS) to receive SSPs from multiple instances of the system for secure storage of said SSPs, wherein each instance of the system is associated with a unique user of the system and/or a unique account within the CCSS, wherein the CCSS is to read and record the SSPID of each SSP associated with any instance of the system and/or with any account within the CCSS.

23. The system of claim 22, wherein the CCSS maintains a sub-inventory of the currency contained in each account.

24. The system of claim 22, wherein the CCSS is to permit transactions between or among users of the system.

25. The system of claim 24, wherein each transaction comprises a change in an ownership record associated with at least one SSP and/or at least one DSP within a given SSP.

26. The system of claim 25, wherein the transactions are encrypted and remotely executable.

27. The system of claim 1 wherein information in the system is recorded in a blockchain.

* * * * *